US011941517B1

(12) United States Patent
Biswas et al.

(10) Patent No.: US 11,941,517 B1
(45) Date of Patent: Mar. 26, 2024

(54) LOW-DIMENSIONAL NEURAL-NETWORK-BASED ENTITY REPRESENTATION

(71) Applicant: Amazon Technologies, Inc., Seattle, WA (US)

(72) Inventors: Arijit Biswas, Bangalore (IN); Subhajit Sanyal, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 1084 days.

(21) Appl. No.: 15/821,660

(22) Filed: Nov. 22, 2017

(51) Int. Cl.
*G06N 3/08* (2023.01)
(52) U.S. Cl.
CPC ..................... *G06N 3/08* (2013.01)
(58) Field of Classification Search
CPC .......... G06N 3/08; G06N 20/00; G06N 20/10; G06N 20/20
See application file for complete search history.

(56) References Cited

U.S. PATENT DOCUMENTS

2017/0096164 A1* 4/2017 Sun et al.

OTHER PUBLICATIONS

Cho et al, "Learning Phrase Representation using RNN Encoder-Decoder", Association for Computational Linguistics, pp. 1724-1734 (11 pages) (Year: 2014).*
Salehinejad et all, "Customer Shopping Pattern Prediction: A Recurrent Neural Network Approach", 2016 IEEE Symposium Series on Computational Intelligence (SSCI), (6 pages). (Year: 2016).*
Keren et al., "Convolutional RNN: an Enhanced Model for Extracting Features from Sequential Data", IEEE, 2016 International Joint Conference on Neural Networks (IJCNN), pp. 3412-3419 (8 pages), (Year: 2016).*
Adi et al., "Sequence Segmentation Using Joint RNN and Structured Prediction Models," IEEE, 2017 IEEE International Conference Acoustic Speech, and Signal Processing (ICASSP) 2017—Proceedings pp. 2422-2426 (5 pages) (Pubilshed Jun. 16, 2017) (Year: 2017).*

(Continued)

*Primary Examiner* — Li B. Zhen
*Assistant Examiner* — William Wai Yin Kwan
(74) *Attorney, Agent, or Firm* — Robert C. Kowert; Kowert, Hood, Munyon, Rankin & Goetzel, P.C.

(57) ABSTRACT

Systems and methods are disclosed to implement a neural network training system to train a multitask neural network (MNN) to generate a low-dimensional entity representation based on a sequence of events associated with the entity. In embodiments, an encoder is combined with a group of decoders to form a MNN to perform different machine learning tasks on entities. During training, the encoder takes a sequence of events in and generates a low-dimensional representation of the entity. The decoders then take the representation and perform different tasks to predict various attributes of the entity. As the MNN is trained to perform the different tasks, the encoder is also trained to generate entity representations that capture different attribute signals of the entities. The trained encoder may then be used to generate semantically meaningful entity representations for use with other machine learning systems.

20 Claims, 11 Drawing Sheets

(56) References Cited

OTHER PUBLICATIONS

Narang et al., "Exploring Sparsity in Recurrent Neural Networks, 2017 International Conference on Learning Represenations", (10 pages) (Revised on Nov. 6, 2017, Initially published on Apr. 17, 2017) (Year: 2017).*

Liu et al., Recurrent Neural Network for Text Classification with Multi-Task Learning, arXiv:1605.05101v1, May 17, 2016, 7 pages (Year: 2016).*

Wang et al., Your Cart Tells You: Inferring Demographic Attributes from Purchase Data, WSDM2016, Feb. 22-25, 2016, ACM 2016, DOI: http://dx.doi.org/10.1145/2835776.2835783, pp. 173-182 (Year: 2016).*

Smirnova et al., Contextual Sequence Modeling for Recommendation with Recurrent Networks, arXiv:1706.07684v1, Jun. 23, 2017, 8 pages (Year: 2017).*

Godwin, Jonathan, Multi-Task Learning in Tensorflow (Part 1), Jun. 30, 2016, https://jg8610.github.io/Multi-Task/, 6 pages (Year: 2016).*

Dai et al., Semi-supervised Sequence Learning, arXiv:1511.01432v1, Nov. 4, 2015, 10 pages (Year: 2015).*

Chintala, Soumith, Understanding Natural Language with Deep Neural Networks Using Torch, Nvidia Technical Blog, Mar. 3, 2015, 7 pages (Year: 2015).*

Tomas Mikolov, et al., "Efficient Estimation of Word Representations in Vector Space", Retrieved from arXiv:1301.3781v3 [cs.CL], Sep. 7, 2013, pp. 1-12.

Mihajlo Grbovic, et al., "E-commerce in Your Inbox: Product Recommendations at Scale", Retrieved from comarXiv:1606.07154v1 [cs.AI], Jun. 23, 2016, pp. 1-10.

Flavian Vasile, et al., "Meta-Prod2Vec—Product Embeddings Using Side-Information for Recommendation", Retrieved from arXiv:1607.07326v1 [cs.IR], Jul. 25, 2016, pp. 1-8.

Tomas Mikolov, et al., "Distributed Representations of Words and Phrases and their Compositionality", In Advances in Neural Information Processing Systems, 2013, pp. 3111-3119.

* cited by examiner

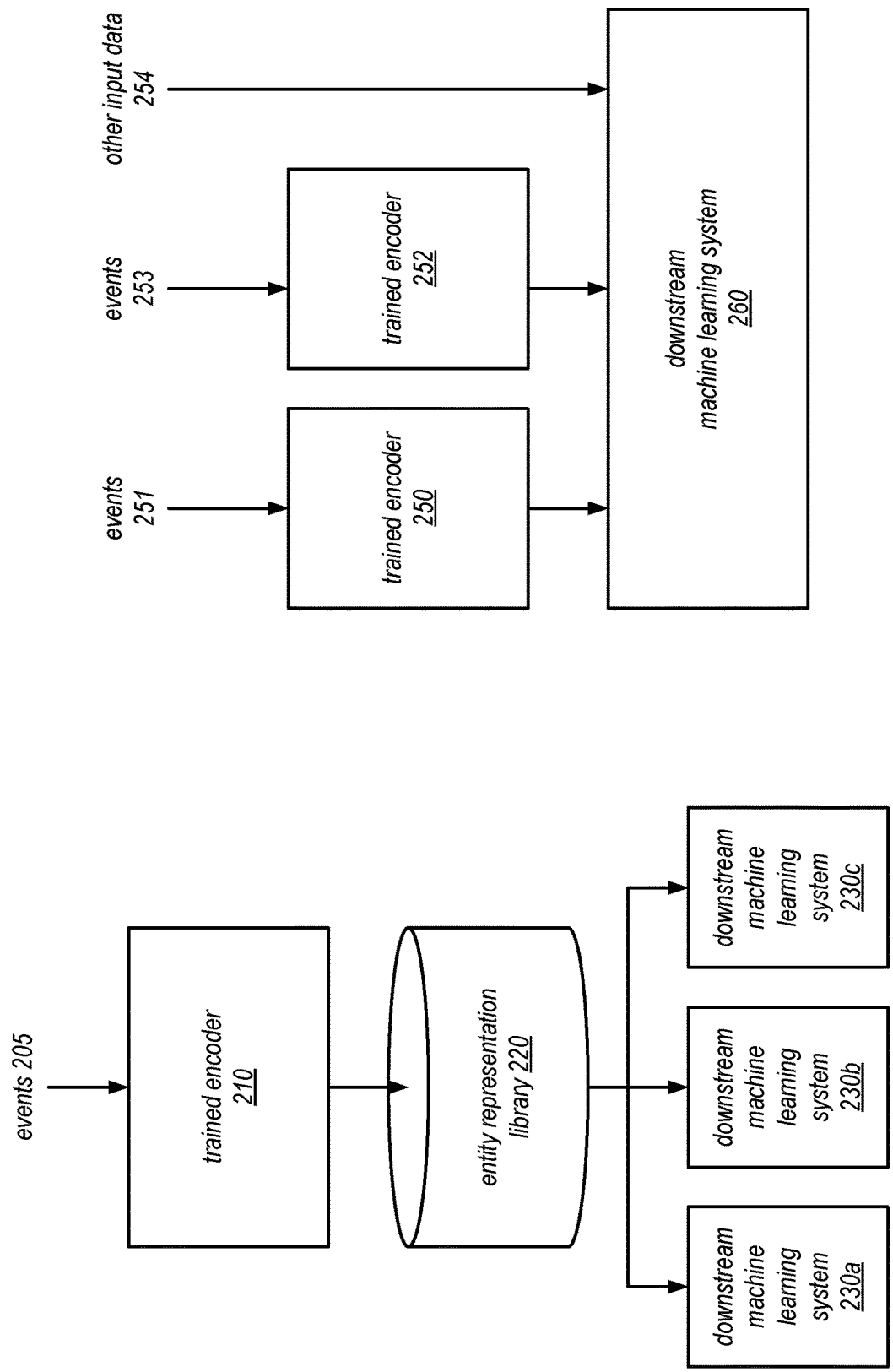

```
┌─────────────────────────────────────────────────────────────────────┐
│  Train an encoder to generate dense entity representations containing attribute signals │
│                              710                                    │
└─────────────────────────────────────────────────────────────────────┘

┌─────────────────────────────────────────────────────────────────┐
│ Receive, at a multitask neural network (MNN), training data including a time-ordered │
│ sequence of events associated with an entity, where the MNN includes an encoder │
│           layer and a group of decoders in a decoder layer       │
│                              712                                 │
└─────────────────────────────────────────────────────────────────┘
                                 │
                                 ▼
┌─────────────────────────────────────────────────────────────────┐
│     Generate, by the encoder layer, a representation of the entity based on │
│                       the sequence of events                     │
│                              714                                 │
└─────────────────────────────────────────────────────────────────┘
                                 │
                                 ▼
┌─────────────────────────────────────────────────────────────────┐
│    Perform, by the decoders, different machine learning tasks to predict │
│     different attributes of entity based on the entity representation │
│                              716                                 │
└─────────────────────────────────────────────────────────────────┘
                                 │
                                 ▼
┌─────────────────────────────────────────────────────────────────┐
│  Update the encoding layer as a result of the MNN training to generate new dense │
│   representations for new entities for input to one or more other machine learning │
│   models, where the new representations contain attribute signals indicating different │
│                       attributes of the new entities             │
│                              718                                 │
└─────────────────────────────────────────────────────────────────┘
```

LOW-DIMENSIONAL NEURAL-NETWORK-BASED ENTITY REPRESENTATION

BACKGROUND

Companies are increasingly using machine learning (ML) algorithms to make future predictions for various entities based on past events associated with the entities. For example, an e-commerce company may use ML techniques to examine the past online behavior of its customers (searching, browsing, purchasing, etc.) in order to predict their attributes (e.g., their age, gender, or future purchasing behaviors). As another example, the service history of an automobile may be used to predict future servicing needs of the automobile.

An entity may be represented to ML models in a number of ways. One common approach is to represent the entity by encoding textual descriptions of recent events associated with the entity in a term frequency-inverse document frequency (TF-IDF) based bag of words representation. However, such a representation is high-dimensional and sparse. For example, in one study, a bag-of-words representation determined for customers based on their last six months of purchase history resulted in representations having a dimension of 73K, and on an average, only around 1% of features in the representations are non-zero. It is difficult to use these high-dimensional representations in practice, because machine training on such representations tend to be slow and expensive, and computing semantically meaningful nearest neighbors using such representations is difficult. Moreover, training using such a large number of features likely results in overfitting of the model to the training data. In addition, the development of appropriate representations for ML models can be a difficult process, sometimes requiring teams of data scientists to perform manual tasks on a regular basis, making the overall process even more inefficient. Accordingly, more useful entity representations for ML models and better ways of generating such entity representations are generally needed.

BRIEF DESCRIPTION OF THE DRAWINGS

FIGS. 2A and 2B illustrate example uses of an entity representation generator that generates dense entity representations containing attribute signals, according to some embodiments.

FIGS. 7A and 7B are flowcharts illustrating processes of training and using an entity representation generator to generate dense entity representations that contain attribute signals, according to some embodiments.

Figure 1A:
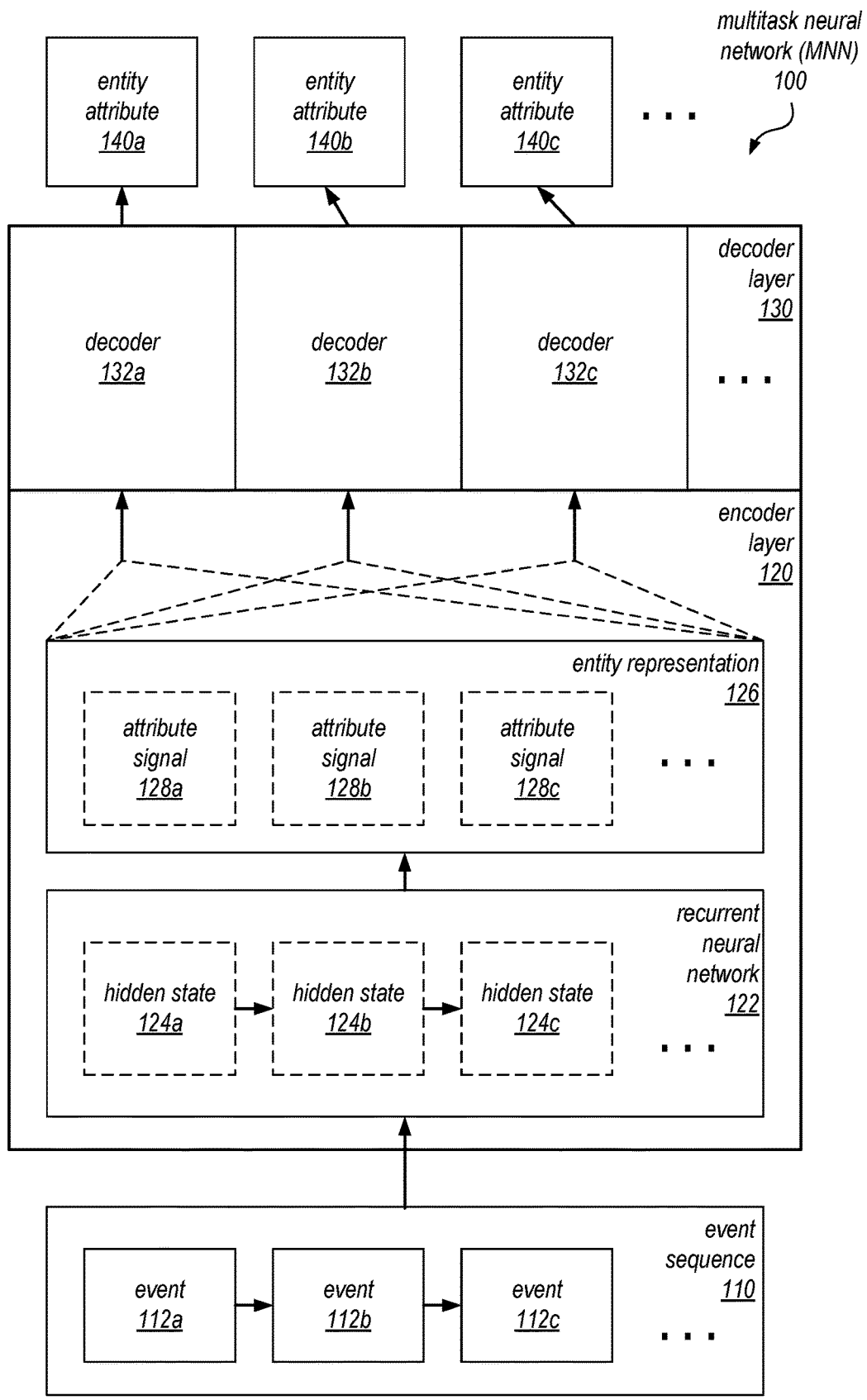
FIG. 1A is a diagram illustrating an example training system that trains an entity representation generator to generate dense entity representations that contain attribute signals, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to train and use an entity representation generator to generate dense entity representations to be used as input to machine learning systems, where the representations are generated to contain attribute signals indicating attributes of the entity. In embodiments, a neural network training system is used train a multitask neural network (MNN) to generate a low-dimensional entity representation based on a sequence of events associated with the entity. In embodiments, an encoder is combined with a group of decoders to form the MNN to perform different machine learning tasks on entities. During training, the encoder takes a sequence of events in and generates a low-dimensional representation of the entity. The decoders then take the representation and perform different tasks to predict various attributes of the entity. As the MNN is trained to perform the different tasks, the encoder is also trained to generate entity representations that capture different attribute signals of the entities. The trained encoder may then be used in various applications to generate semantically meaningful entity representations for use with other machine learning systems. As may be understood, by using the decoders to train the encoder layer, the training system teaches the encoder layer to learn the important attribute signals that are relevant to the decoders' machine learning tasks. In embodiments, the decoders may be selected so as to elicit a particular set of generic attribute signals in the entity representations that are useful to downstream machine learning systems.

Companies are increasingly using machine learning (ML) algorithms to make future predictions for various entities based on past events associated with the entities. For example, an e-commerce company may use ML techniques to examine the past online behavior of its customers (searching, browsing, purchasing, etc.) in order to predict their attributes (e.g., their age, gender, or future purchasing behaviors). As another example, the service history of an automobile may be used to predict future servicing needs of the automobile.

An entity may be represented to ML models in a number of ways. One common approach is to represent the entity by encoding textual descriptions of recent events associated with the entity in a term frequency-inverse document frequency (TF-IDF) based bag of words representation. In a TF-IDF representation, a numerical statistic is captured for a bag of words in a document, which reflects how important the word is to the document. The TF-IDF value may increase with increasing frequency of the word in the document, and decrease with the frequency of the word in a general corpus of documents, to adjust the value for the fact that some words (e.g. "of") appear more frequently in general.

However, the TF-IDF bag-of-words approach creates entity representations that are high-dimensional and sparse. For example, in one study, a bag-of-words representation determined for customers based on their last six months of purchase history resulted in representations having a dimension of 73K, and on an average, only around 1% of features in the representations are non-zero. It is difficult to use these high-dimensional representations in practice, because machine training on such representations tend to be slow and expensive, and computing semantically meaningful nearest neighbors using such representations is difficult. Moreover, training using such a large number of features likely results in overfitting of the model to the training data. In addition, the development of appropriate representations for ML models can be a difficult process, sometimes requiring teams of data scientists to perform manual tasks on a regular basis, making the overall process even more inefficient.

Accordingly, in some embodiments, a multitask neural network (MNN) is created to train an entity representation generator to generate low-dimensional entity representations that are injected with attribute signals that are useful for downstream ML systems. In some embodiments, the entity representation generator may be a neural network that is used as an encoder layer within the MNN. In some embodiments, the encoder layer may a recurrent neural network (RNN) that generates hidden states of the entity representation based on successive events in an input event sequence. In some embodiments, the RNN may be implemented using Long Short-Term Memory (LSTM) units to store the hidden states.

In some embodiments, the MNN also includes a group of decoders in a decoder layer that perform machine learning tasks to predict various attributes of entities based on the entity representation generated by the encoder layer. In some embodiments, the task set for the decoders may selected to capture a particular set of generic attribute signals in the entity representations that are useful to downstream machine learning systems. For example, in an embodiment where the entity representation relates a customer and is generated based on the purchase history of the customer, the decoder tasks may include (1) predicting a product category of the customer's next purchase, (2) predicting a time period of the next purchase, and (3) predicting the price range of the next purchase, etc. In some embodiments, the decoder tasks are selected so that the different attributes that are injected into the entity representation are a generic set of attributes (e.g., age, gender, etc.) that are likely to be useful to a wide range of ML systems. The MNN is jointly trained with all tasks in an end-to-end manner. In some embodiments, the training of the different decoders may occur in an alternating fashion, where during any given training iteration, only one or some subset of the tasks are trained. When the MNN is trained in this manner, the encoder layer is also trained to generate entity representations that capture various feature signals from the event sequences that are relevant to the decoders.

The generated entity representations may be used as input to other machine learning systems, and the resulting encoder layer (i.e. entity representation generator) may be used to generate additional representations for other entities, and may in some embodiments be incorporated into larger machine learning systems to ingest event sequences as input. The representations generated and the trained representation generator allows later developers to build a good baseline model with little effort. In addition, models for new ML tasks for new entity attributes may be developed to augment the generic set of signals captured by an existing representation generator. These and other benefits, features, and applications of the entity representation generation system are described in further detail below, in conjunction with the figures.

FIG. 1A is a diagram illustrating an example training system that trains an entity representation generator to generate dense entity representations that contain attribute signals, according to some embodiments. As shown, the system 100 is a multitask neural network (MNN). In some embodiments, the MNN may be a machine learning model (e.g., a neural network) that is trained and executed using computers to perform a plurality of machine learning tasks. As shown, the MNN includes an encoder layer 120 that accepts input 110, and a set of decoders 132 in a decoder layer 130 that produces output 140.

The MNN system 100 may be implemented on a computer system, which may include one or more processing units. In some embodiments, the MNN system 100 may be implemented using a single server, which may include one or more processors or processor cores. In some embodiments, the MNN 100 may be implemented such that it can be used to train the encoder layer 120 in parallel using different sets of training data in a scalable fashion. For example, in some embodiments, the MNN 100 may be trained in parallel fashion, via multiple processes or threads on a computer. In some embodiments, the MNN 100 may be implemented using a group of compute nodes, each having its own CPU, which may be configured to perform the machine learning tasks separately. In some embodiments, the compute nodes that are used to implement the MNN 100 may be implemented as instances of virtual machines that are hosted on physical servers, and such virtual machine instances may be provisioned dynamically, to suit the runtime needs of the system.

As shown, the input to the MNN 100 may comprise an event sequence 110. The event sequence 110 may include a time-ordered sequence of events 112a-c that relate to an entity. Examples of an entity may include, for example, a person (e.g. a customer), an organization, an object (e.g. a product), a time period (e.g. a day of the week), or some other entity having attributes that may be extracted from the events 112. Examples of events may include, for example, a person's activities with regard to different products (e.g., searching, browsing, purchasing, or returning of different products), a person's employment or medical history, a car's service history, news events associated with a company or organization, a person's journal entries, reviews of a particular movie, passages from a book relating to a particular character, etc. As will be understood by those skilled in the art, these are merely example applications and the concepts in the present disclosure are broadly applicable to many different applications.

As shown, in some embodiments, the MNN 100 may ingest the input 110 using a recurrent neural networks (RNN) 122. In some embodiments, the connections in the RNN 122 between units may form a directed cycle, which allows the RNN to exhibit dynamic temporal behavior. In some embodiments, the units of the RNN 122 may include memory units, such as Long Short-Term Memory (LSTM) units. LSTM units may be used in RNN networks to remember values over arbitrary intervals. An LSTM may be used to classify, process, and predict time series given time lags of unknown size and duration between important events. Relative insensitivity to gap length gives an advantage to LSTM over alternative memory models and other sequence learning methods in numerous applications. Using the LSTMs as memory units, the RNN may ingest incoming data progressively, and the memory units may be updated with the progressive incoming data, generating successive hidden states 124a-c of the RNN. Thus, as incoming data is consumed by the RNN, the RNN's state is updated from one hidden state 124 to the next, as supported by memory units such as LSTM units. In some embodiments, each of the RNN hidden states 124 may be based on a next input event 112 from the input event sequence 110, and the previous hidden state 124.

As shown, the encoder layer 120 may then generate an entity representation 126 based on the hidden states 124 generated by the RNN 122. In some embodiments, a final hidden state 124 of the RNN 122 may represent the entity representation 126. In some embodiments, additional layers of process may occur on top of the hidden states 124 of the RNN 122, to convert the hidden states 124 into the entity representation. For example, in some embodiments, the encoder layer 120 may implement a multilayered architecture, where additional layers are used to learn higher level features from the hidden states 124 of the RNN 122.

In some embodiments, the entity representation 126 may comprise a dense vector that includes attribute signals 128a-c, which may be relevant signals to be used by the decoders 132a-c to generate the output entity attributes. In some embodiments, the entity representation 126 may be a fixed-size vector, for example, a 128-bit or 256-bit vector. Each attribute signal 128 in the representation may be captured by one or more bits in the vector.

In some embodiments, as shown, the MNN 100 may include a decoder layer 130, which may include decoders 132a-c. Each decoder 132 may be a separate decoder that performs a machine learning task to predict a different attribute 140 of the entity from the entity representation 126. In some embodiments, a single decoder 132 may predict multiple entity attributes 140. In some embodiments, multiple decoders 132 may be combined to generate a single attribute 140.

As may be understood, when the MNN 100 is trained to perform the various machine learning tasks via the decoders 132, the encoder layer is also trained to generate an entity representation 126 that includes relevant attribute signals 128 for the decoders. Thus, the MNN 100 trains the encoder layer 120 to inject different kinds of static and dynamic signals into the representation 126. The goal of injecting different signals is to create representations 126 that includes a set of generic attributes of the entity, based on the event sequence 110. These learned representations 126 will be useful for not just the trained decoders 132, but any ML task that is correlated with one or more of the trained tasks.

In some embodiments, a set of different tasks may be selected to train the encoder layer 120 to generate entity representations 126. The tasks may be selected to include various intrinsic features, attributes, or properties of the entity. However, it is understood that the selection of tasks may be application dependent, and vary from embodiment to embodiment. In some embodiments, the set of training tasks may be different for different categories of entities, so that a different type of representation is generated for each entity category. In some embodiments, the training tasks may be divided into different groups, in order to create a diverse selection of information that is captured by the representation 126. For example, in some embodiments, some training tasks may comprise predictions of static information that are unlikely to change over the lifetime of an entity, for example, the gender of a person or the model of a car. On the other hand, some tasks may predict dynamic information that are likely to change over time, for example, the month-to-month purchasing volume of a person or probability of rainfall in the next five days. The training tasks may also include tasks that generate different types of outputs (e.g., classification output or regression output).

As a result of this training on the MNN 100 to perform the set of machine learning tasks, the encoder layer 120 is also trained to generate entity representations 126 that include attribute signals 128 that are relevant to the decoding tasks of the MNN 100, and also useful for future ML tasks on the entities. The training process thus trains an entity representation generator (the encoder) that may be used to generate representations that capture a set of generic attributes or features of the entity, which may be used as input to other machine learning models on the entities. Advantageously, the resulting representations are low-dimensional and dense, and can in some embodiments be encapsulated in a relatively small fixed-size vector.

Figure 1B:
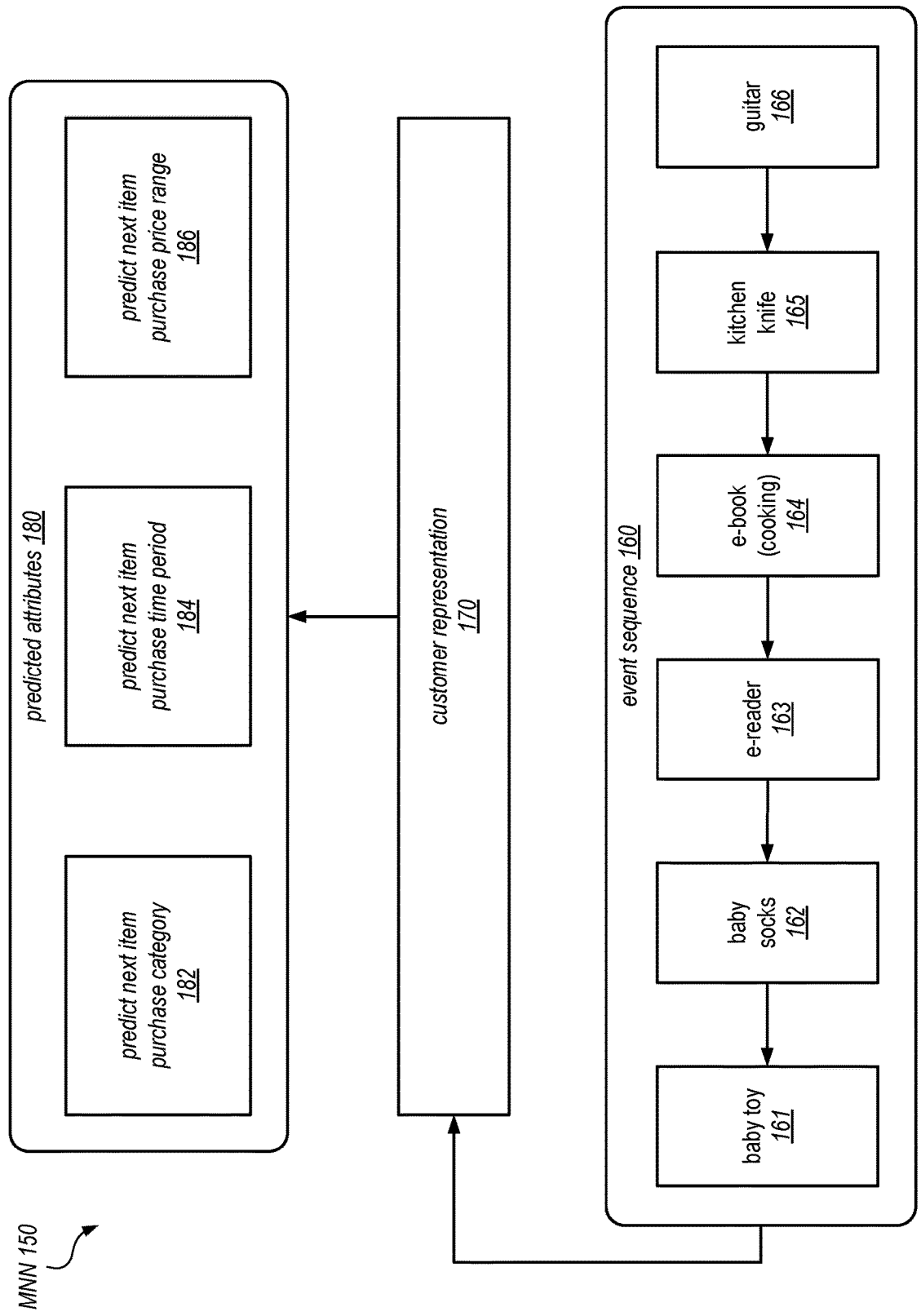
FIG. 1B is a diagram illustrating an example training system that trains a generator of customer representations based on an item purchase history, according to some embodiments.

FIG. 1B is a diagram illustrating an example training system that trains a generator of customer representations based on an item purchase history, according to some embodiments. Thus, as may be understood, the MNN 150 shown in FIG. 1B represents one application of the training system of FIG. 1A.

As shown, MNN 150 takes as input an event sequence 160 of product purchases, and generates a customer representation 170 of a customer. Thus, as shown, representations of individual customers may be generated via the encoder layer based on the recent purchase histories of the customers. In some embodiments, the histories 160 may include not just purchases of the customers, but also other activities or interactions with the customer that may be logged by an e-commerce system, such as for example, a search for a category of products or based on keywords, examining or reviewing details of particular products, placing a product on a wish list or in a shopping cart, returning a product, leaving feedback or review of a product, etc. In some embodiments, the history associated with a customer may be limited to a time window (e.g., a six-month window). In some embodiments, the history may be limited in size (e.g., a maximum of 100 events or 20 purchase events, etc.). In some embodiments, the final purchase event in the time window may be used as a truth label in the training data to train the MNN 150 to predict attributes of a future purchase. In some embodiments, the encoder layer may assign more weight to more recent purchases.

As shown, the purchase history 160 includes different products that the customer has purchased during a time window. The events in the history 160 may indicate different attributes of the customer. For example, events 161 and 162 may indicate that the customer has a baby, or a friend who has a baby. Event 163 and 164 may indicate that the customer is likely to purchase e-books or e-reader accessories in the near future. Events 164 and 165 may indicate that the customer is interested in cooking. And event 166 may indicate that the customer is a musician or interested in musical instruments, etc. All of these attributes of the customer may be extracted from the product purchase history 160, using a set of appropriately selected decoders in the MNN 150 (e.g., decoders 182, 184, and 186).

In some embodiments, each event in a history of a customer may be a product interaction and associated with a product. Thus, each event in the sequence may include a representation of a product. In some embodiments, the product representation may be in a TF-IDF bag-of-words representation. However, as discussed, such representations are high-dimensional and sparse, making it difficult to effectively model the semantic information in the sequential data. Hence, in some preferred embodiments, the products may be represented in dense or fixed-size representations that are generated via another ML model.

In some embodiments, a vector representation of a product may be generated using individual words in a description of the product, such as the product's title in a product registry or catalog. In some embodiments, each word may be converted to a fixed-size word representation using for example a Skip-gram model, which is trained to reflect the surrounding context of the word in a corpus of training data. For example, the word representation may be generated so that it is useful in predicting other nearby words. Next, the training data corpus may be used to find the inverse document frequency (IDF) of all the words in the vocabulary. The word representations corresponding to each word in the product description may then be multiplied with the corresponding IDF weight and are summed across all the words in the product description. In some embodiments, the representations are normalized by the total IDF score of all the words in the title. In this manner, a fixed-size (e.g., 128 dimensional) representation of the product may be generated for each product.

Persons of ordinary skill in the art would understand that this is merely one example of generating product representations. Other methods, including ML methods are may also be used. For example, in some embodiments, the product representations may be derived from the product descriptions by training an encoder layer to generate a representation that is fed to a group of decoders to perform a variety of ML tasks to predict different features of the product (e.g., its price, size, color, etc.). A product representation generated in such a manner may include feature signals indicating the different features of the product.

As shown, different purchase related tasks (e.g., tasks 182, 184 and 186) may be selected to train the encoder layer to generate customer representations. As discussed, in some embodiments, the MNN 150 may be configured to predict a set of attributes 180 of a future or a next purchase based on the seen purchase history 160. In some embodiments, the final purchase event of a customer within a time window may be used as a truth label in the training data to train the MNN 150 to predict attributes of the future purchase.

As shown, decoder task 182 predicts the purchase category of the next item. In this task, a specified category from which a customer will make her next purchase is determined. In some embodiments, there may be hundreds of different product categories, and the MNN 150 is trained to classify the customer into one or more of the product categories. As shown, decoder 184 predicts the purchase time period of the next purchase. In some embodiments, the output of this task is bucketized into a number of different categories. For example, if a customer makes the next purchase within a week, she is assigned label 0. If she comes back within two weeks, a month, a quarter, six-months or a year, she may be assigned the labels 1, 2, 3, 4, and 5 respectively. As shown, decoder 186 predicts the price range of next purchase. In this task, the decoder attempts to determine how much a customer will spend on the next purchase. The output may be divided into eight different classes, for example.

In some embodiments, other types of purchase-related prediction tasks may be used. In some embodiments, a suite of benchmark tasks may be used to test the customer representations generated by a trained customer representation generator. In some embodiments, the benchmark tasks may be more application-specific than the tasks that are used to train the encoder, which may be a set of more generic tasks to predict more generic attributes of the customer. In some embodiments, the benchmark testing may be performed using the same training data that was used to train the encoder layer.

In some embodiments, a "product category diversification" indicator may be used as a decoder task. In this task, the decoder predicts if a customer will buy a product in a new product category in the next time period (e.g. three months) based on her purchases during the time window for the purchase history (e.g. last six months). The representations generated from the encoder are used to predict whether a customer will buy in any products in new product categories (which she did not buy during the time window) during the next time period. In some embodiments, this decoder task may be a binary classification task with an output of yes or no.

In some embodiments, a "customer attrition" indicator may be used as a decoder task. In this task, the decoder predicts if a customer, who bought at least once every time period (e.g. every month over the last six months), will not purchase anything over a next time period (e.g. the next three months). In other words, this indicator indicates an "attrition" of the customer.

In some embodiments, a "baby product purchase" indicator may be used as a decoder task. In this task, the decoder predicts if a customer will buy any baby product over the next time period (e.g. next three months) based on his/her purchases during the time window (e.g. the last six months). In some embodiments, such an indicator may suggest possible important life event in a customer's life (such as child birth) by using the customer's product purchase history or generated customer representation. In some embodiments, the output of this task may be a binary classification.

In some embodiments, the customer's income band may be used as a decoder task. In this task, the decoder attempts to predict the income band of a customer, based on their purchase history during the time window. In some embodiments, this task is a multiclass classification task that outputs different income bands for each customer. These lists of decoder tasks and attributes are not intended to be exhaustive, and persons of ordinary skill in the art would understand that other attributes or machine learning tasks may be used to train the entity representation generator.

As discussed, in some embodiments, one or more of the above decoder tasks may be used to perform a benchmark testing of the entity representation encoder after it has been trained. Thus, the trained encoder may be used to generate entity representations, which are in turn used to perform other tasks indicated by one or more decoders chosen for the benchmark testing. In one study, a trained customer representation encoder was tested using a suite of benchmark tasks including the "product category diversification" indicator, the "customer attrition" indicator, the "baby product purchase" prediction, and the income band prediction tasks. The results were compared to baseline results obtained using a sparse TF-IDF representation. The results of the study indicate that the dense customer representations generated using the trained encoder generally performed no worse than the TD-IDF representations, despite using a smaller representation space. In some cases, the dense representations performed better. In addition, the ML models that employed the dense representations were in generally smaller in size and faster to train. Because the training decoder tasks are selected to elicit generic attribute signals from the input data, the resulting representations are likely to be useful for a wide variety of ML models.

The operations of an example embodiments of the MNN 100 or 150 will be now described more formally. As discussed, a representation of each product purchased by a customer is fed through an RNN layer containing LSTM cells. A hidden layer representation from the RNN, treated as the customer representation, is used to predict multiple task labels, as shown. The MNN 100 or 150 is trained jointly with all of these tasks in an end-to-end manner.

Assume that the sequence of N product purchases by a customer is denoted by $\{a_1, a_2, \ldots, a_N\}$, where an indicates, for example, a 128-dimensional product representation of the n-th product purchased by the customer. Assume that $t_n$ indicates the corresponding day on which the product was purchased and $g_n$ indicates the ID of the corresponding product category. The multiple tns are computed with respect to the total number of days beginning from the first day of the time period associated with the sequence (e.g., nine-month period). For example, if a product is purchased on the first day, corresponding $t_n$ will be 0. The normalized value of $t_n$ and the product category ID $g_n^2$ are also concatenated with $a_n$ to create, for example, 130-dimensional input. The input sequence to the RNN is given by $\{x_1, x_2, \ldots, x_N\}$, where $x_n=[a_n, t_n, g_n]$. Assume further that $h_t$ denotes the hidden state of the RNN at time t. Thus, the recursive equation of the RNN used in this example is given by:

$$h_t=\phi(Wx_t+Uh_{t-1}) \tag{1}$$

Here W is the feedforward weight matrix and U is the recursive weight matrix of the RNN. $\phi$ may be a nonlinearity such as tanh or RELU. Assume that $h_T$ denotes the final hidden representation of a customer after all the products purchased by the customer have been fed through the RNN. In this example, the RNNs are trained using Backpropagation Through Time (BPTT). Although the RNNs are designed to model sequential data, it has been found that in some embodiments, it is difficult for simple RNNs to model long sequences because of the vanishing gradient problem. Long Short-Term Memory units are designed to tackle this issue where along with the standard recursive and feedforward weight matrices there are input, forget, and output gates, which control the flow of information and hence can better remember very long sequences. In some embodiments, RNNs with LSTM units may perform better than other RNNs (e.g. Equation 1) in modeling sequence information. Hence, in some embodiments, the entity representation encoder may use LSTM units in the RNNs.

In some embodiments, the MNN 100 may be trained with N different classification tasks where $l_n$ denotes the loss corresponding to the n-th task. While training, embodiments of the training system may optimize the following loss $$L = \sum_{n=1}^{n=N} l_n$$

which is the sum or the losses of all N tasks. In some embodiments, the hidden representation $h_T$ corresponding to a customer may be projected to multiple output vectors (one for each task) using task specific weights and biases (e.g., Equation 2). The loss may then be computed as a function of the output vector and the target vector. For example, if the task is a five-class classification task, $h_T$ may be projected to a five-dimensional output, followed by a softmax layer. A cross-entropy loss may eventually be computed between the softmax output and the true target labels. In some embodiments, the losses corresponding to all the training tasks may be kept in the same range such that one task with a higher loss cannot dominate the other tasks.

$$o_n=W_nh_T+b_n \tag{2}$$

Depending on the embodiment, the training may be performed either jointly on all of the decoders, or in an alternating fashion. Thus, in some embodiments, the cost function may be optimized in two different ways.

In a joint optimization approach, at each iteration of training, all weights of the MNN 100 or 150 (including the encoder layer) are updated using gradients computed with respect to the total loss. However, if each training example does not have labels corresponding to all the tasks, training using a joint optimization approach may not be preferable.

In an alternating optimization approach, at each iteration of training, one (or some subset) of the decoders (and an associated task) is randomly chosen, and the MNN 100 or 150 (including the encoder layer) is optimized with respect to the loss corresponding to the chosen task. In this case, the weights which correspond to that particular task and the weights of task-invariant layers (e.g., the encoder layer 120) are updated. However, the task-specific weights of other tasks are not updated in that particular iteration. In some embodiments, this style of training is preferable when not all task labels for all tasks are available. However, in some cases, the training might be biased towards a specific task if the number of training examples corresponding to that task is significantly higher than other tasks. Thus, in some embodiments, the training may sample training data batches for each task in a uniform manner to avoid biasing towards any specific task.

In some embodiments, the training system may be configurable to alternate between the two optimization approaches described above. In some embodiments, the training system may allow a training iteration to occur on a subset of the decoder tasks, for example, based on the presence of truth labels that are present for the different tasks. In some embodiments, the MNN 100 or 150 may be implemented as a flexible framework that allows modelers to add or remove training tasks to train the representation encoder, so that the framework can be used to train entity representation encoders in different ways in the future.

FIGS. 2A and 2B illustrate example uses of an entity representation generator that generates dense entity representations containing attribute signals, according to some embodiments.

FIG. 2A illustrates a use case where a trained encoder 210 is used to generate a library 220 of entity representations for downstream machine learning systems 230a-c. As shown, after an encoder 210 is trained, it is separated from the decoders (e.g. decoders 132 of FIG. 1A), and the encoder 210 may be used as a standalone entity representation generation system to generate entity representations. The encoder 210 may be used to generate entity representations for new event sequences 205, which may be associated with entities that were not included in the training data. The generated entity representations may then be stored in the entity representation library 220, which may be a data store that stores entity representations to be used as input to downstream machine learning systems 230. The representations may be used to predict additional features or attributes of the entity, or make other decisions about the entities, based on their event sequences 205. In some cases, the representations in the library 220 may be used as training data to train the downstream machine learning systems 230.

For example, representations generated for shoppers may be used to predict or train downstream models 230 to make decisions about users that were not implemented by the decoders 132 during training. In some embodiments, the downstream machine learning systems may use multiple entity representations from the library 220 as input, for example to predict different types of correlations between entities. In some embodiments, multiple encoders may be trained, and each representation generator may generate a different type of representation. For example, in some embodiments, entities in different entity categories may be used to generate different groups of category-specific representations. In some embodiments, representations may be generated on different sets of attributes of the same entities, e.g., one group of user representations for shopping behavior attributes, and another group for travel behavior attributes. In some embodiments, different types of representations may be generated for different types of input event sequences (e.g., user reviews versus user purchases). All of these types of generated representations may be used as input to downstream machine learning systems 230 that rely on the attribute signals included in these representations. In this manner, model developers for the downstream machine learning systems need not spend time developing or training a model to extract the generic attributes of the entities that are already present in the entity representations.

In addition, advantageously, the entity representations may be encoded in a manner that does not readily reveal any substantive information about the event sequence 205. This feature of the entity representation is useful in situations where the event sequence 205 contains confidential or sensitive information, which cannot be shared publicly. However, by encoding the event sequence into the entity representation, the representation may be transmitted over a public network or even distributed to third parties to perform different ML tasks, without fully revealing the input event sequence 205. For example, in some embodiments, the event sequence 205 may indicate purchases or online behavior of individual users. Such information is sensitive and cannot be generally shared or transmitted over a public network. However, a generated representation of a user does not directly reveal such sensitive information, and thus, in some embodiments, the representation may be transmitted over public networks or even shared with third parties.

FIG. 2B illustrates another use case for trained encoders 250 and 252. As shown, in this case, the two trained encoders 250 and 252 are incorporated as different input layers that feed into a downstream machine learning system 260. The downstream machine learning system 260 may include a number of input layers that ingest event sequences such as sequences 251 and 263, and may also use other input data 254, as shown. The trained encoders 250 and 252 may be attached to the downstream machine learning system 260 as part of a production prediction system, or in some embodiments, the encoders may simply be used to train the downstream machine learning system 260. In some embodiments, while the downstream machine learning system 260 is trained, the trained encoders 250 and 252 may not be updated. In some embodiments, encoders such as encoders 250 and 252 may be saved in a library of trained representation generators. As discussed, different encoders may be trained for different purposes, such as different attribute sets, different entity categories, or different types of input event sequences.

In some embodiments, downstream learning model 230 or 260 may be, for example, subsystems of an e-commerce system that receives and processes different types of event sequences of users, such as user actions or interactions with different products. These different types of events may be converted into entity representations with attribute signals, and then used to perform a variety of additional programmatic tasks. For example, in some embodiments, the downstream systems 230 or 260 may implement a product recommendation system that recommends future products to the user based on his or her event history.

Another example of a larger system or downstream system that may use an entity representation generator may be a system that logs interactions with other users (e.g., a dating website). These interactions of users may be converted into representations for each user, and then provided to downstream systems to analyze and/or classify or predict attributes of the users. As yet another example, the entity representation generators may be included as part of a progress tracking system to track the progress of students. For example, events such as test scores and tested subject matter may be provided to an encoder to generate a representation of the student, which may then be used to predict future test performance of the student. A person of ordinary skill in the art would understand that these discussions of downstream systems 230 and 260 are merely examples. Other types of downstream entity analysis systems may also be implemented using the entity representation generators 210, 250, or 252, and are contemplated within the scope of this disclosure.

In some embodiments, systems 210, 230, 250, or 252 may be implemented as part of a machine learning service (MLS) designed to support large numbers of users and a wide variety of machine learning algorithms to solve problems. In some embodiments, the MLS may include a number of programmatic interfaces, such as application programming interfaces (APIs) defined by the service, which guide non-expert users use machine learning best practices relatively quickly, without the users having to expend a lot of time and effort on tuning models, or on learning advanced statistics or artificial intelligence techniques. The interfaces may, for example, allow non-experts to rely on default settings or parameters for various aspects of the procedures used for building, training and using machine learning models, where the defaults are derived from the accumulated experience of other practitioners addressing similar types of machine learning problems. At the same time, expert users may customize the parameters or settings they wish to use for various types of machine learning tasks, such as input record handling, feature processing, model building, execution and evaluation. In at least some embodiments, in addition to or instead of using pre-defined libraries implementing various types of machine learning tasks, MLS clients may be able to extend the built-in capabilities of the service, e.g., by registering their own customized functions with the service. Depending on the business needs or goals of the clients that implement such customized modules or functions, the modules may in some cases be shared with other users of the service, while in other cases the use of the customized modules may be restricted to their implementers/owners.

In some embodiments, systems 210, 230, 250, or 252 may be included in a ML toolkit used to program machine learning systems to perform tasks such as extracting records from data sources, generating statistics on the records, feature processing, model training, prediction, etc. An embodiment of the entity representation generator may be made available as a library module in the toolkit, as one option to allow users to generate generic entity representations from a known type of event sequences. Users of the toolkit may then develop more complex or application-specific machine learning systems, using the included entity representation generators. As may be understood, the entity representation generators may be used as building blocks to build more sophisticated downstream machine learning systems, or used to train such downstream machine learning systems. As will be appreciated by those skill in the art, such prebuilt representation generators reduce the time and resources needed to develop downstream machine learning models for entities.

Figure 3:
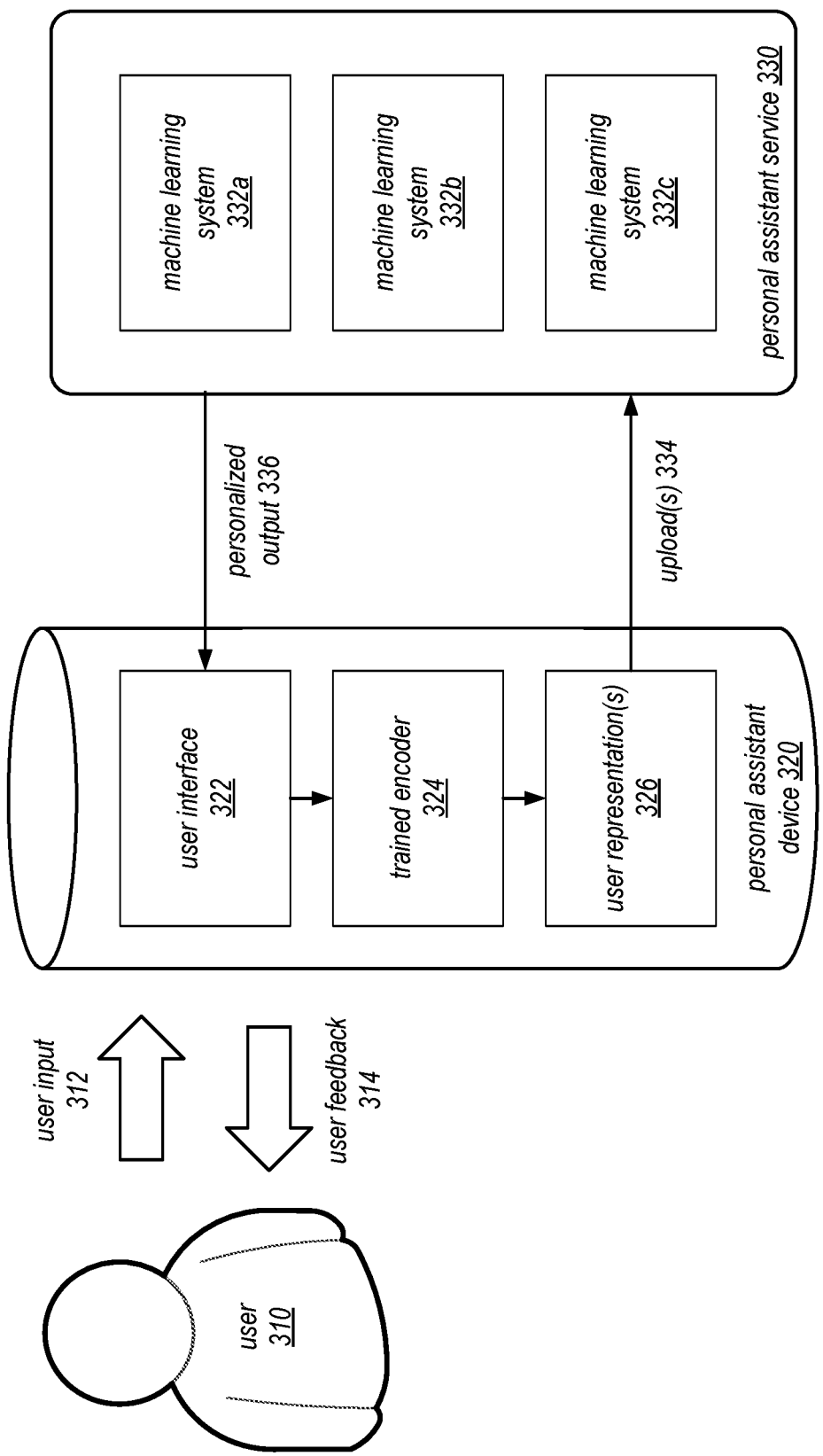
FIG. 3 illustrates an example use of a representation generator that generates dense user representations containing attribute signals, according to some embodiments.

FIG. 3 illustrates an example use of a representation generator that generates dense user representations containing attribute signals, according to some embodiments.

As shown, in some embodiments, a trained encoder such as the encoder 120 as discussed in connection with FIG. 1 may be deployed on a computing device that interacts with a user 310. In some embodiments, the computing device may be used to implement a personal assistant device 320. The personal assistant device 320 may interact with the user 310 to perform a wide range of personal tasks. In some embodiments, these personal tasks may include for example, performing a number of the user's computer-related tasks (e.g., retrieving voicemails, setting calendar events, providing driving directions, performing online searches, making product recommendations, ordering products or making reservations, etc.). Depending on the embodiment, the personal assistant device may be implemented using a household computer, a laptop, a smartphone, an appliance such as a smart television, or a vehicle-based computer, among other things.

In some embodiments, as shown, the personal assistant device 320 may include a user interface 322, which may be used to receive user input 312 from the user and provide user feedback 314 to the user. In some embodiments, the user interface 322 may be implemented using a combination of one or more computer-interfacing components such as a keyboard, a mouse, a screen or touchscreen, a headset, a microphone, or one or more sensors that are configured to capture the location, movement, temperature, visual view, or other inputs associated with the user 310. In some embodiments, a screen-based user interface may implement a graphical user interface (GUI) that provides feedback to the user. In some embodiments, the GUI may be implemented using a touch screen that is able to receive user input via haptic sensors located within the device 320. In some embodiments, the user interface 322 may be implemented using a voice interface, which and receive audio commands from the user 310, and/or provide audio output to the user 310.

In some embodiments, the user interface 322 may take the user input 312, and provide the input as a sequence of events to the trained encoder 324 to generate representations of the user. For example, in some embodiments, an audio-controlled device may provide a sequence of received audio commands from the user 310 to the trained encoder 324. In some embodiments, the audio commands may first be extracted from voice signals captured from the user, so that the sequence of events include text commands that are determined from the user's voice signals. In some embodiments, the sequence of events may comprise text commands that are provided by the user to the device 320. In some embodiments, the sequence of events may include keywords in searches that are performed by the user or texts sent or received by the user. In some embodiments, the sequence of events may include websites that are visited by the user or apps that are launched by the user. In some embodiments where the device is a multiuser system, the device 320 may generate different representations for each user, for example based on the login under which input data is received. In some embodiments, the user representations 326 may be generated periodically for each user, for example once per day or per week, so as to capture the user's behavior or interactions during that specific time period.

In some embodiments, as shown, the generate user representations 326 may be uploaded 334 to a personal assistant service 330. In some embodiments, the uploads may occur periodically to provide different representations of the user 310 over different time periods to the service 330. As discussed, because the user representation is encoded in a way that is not readily decipherable by a third-party observer, in some embodiments, the upload 334 may be performed via a public network without excessive risk of revealing confidential information about the user 310 or violating the privacy expectation of the user 310. In some embodiments, the representation may be encrypted before it is uploaded or sent via an encrypted communication protocol.

In some embodiments, as shown, the personal assistant service 330 may implement a number of machine learning systems 332a-c. In some embodiments, such ML systems may be configured to perform different ML tasks for groups of users who interact with different devices 320. Based on the received user representations 326, the machine learning systems 332 may perform a variety of ML tasks for the user 310. For example, in some embodiments, a machine learning system 332 may generate personalized output 336 for the user, which may be sent back to the personal assistant device 320 to be provided to the user 310. In some embodiments, the personalized output 336 may be sent back to a different device, or via a different communication method, such as via an email or a text. In some embodiments, the personalized output 336 may comprise one or more product recommendations to the user 310. In some embodiments, the personalized output 336 may include other useful information for the user, for example, an article may be useful to the user 310, or a suggested contact for the user 310. In some embodiments, the machine learning systems 332 may be configured to perform ML tasks other than generating personalized output. For example, in some embodiments, the ML systems 332 may simply classify users 310 into different categories based on their user representations 326.

Persons of ordinary skill in the art would understand that the details of the system shown in FIG. 3 is merely illustrative, and numerous variations on the system may be implemented without departing from the inventive concepts described herein. For example, in some embodiments, the trained encoder may be trained partially on the device 320, so that it can adapt to certain attributes of the user 310 locally. In some embodiments, at least some of the ML systems 332 may reside on the device 320, so that the representation 326 need not be uploaded to any service 330. In some embodiments, different ML systems 332 may be downloaded onto the device 320 to perform ML tasks based on the user representation 326. In some embodiments, the ML systems 332 may be downloaded to the device as third-party apps.

Figure 4:
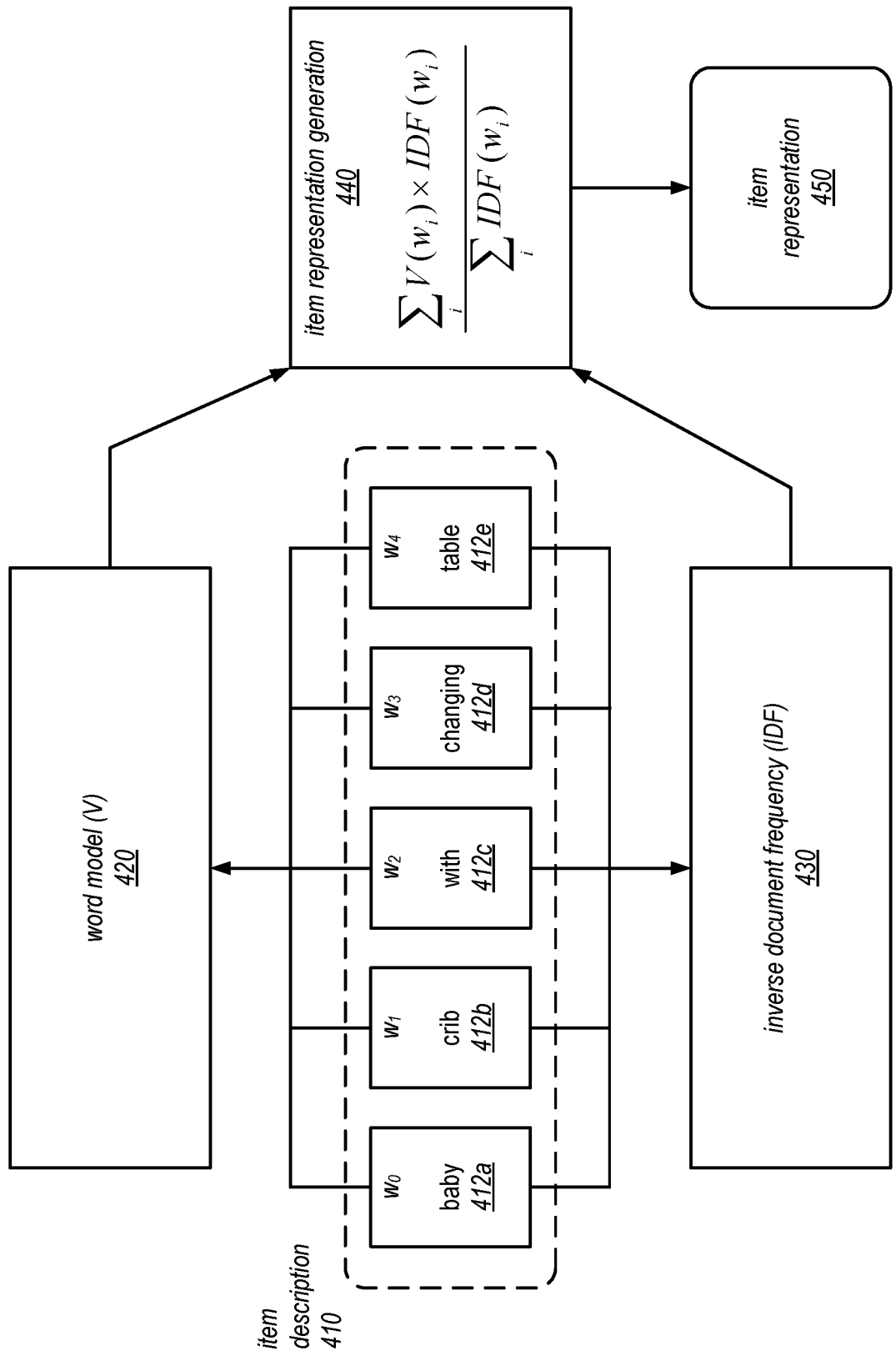
FIG. 4 illustrates an example process of generating dense item representations from item descriptions, according to some embodiments.

FIG. 4 illustrates an example process of generating dense item representations from item descriptions, according to some embodiments. As discussed, in some embodiments, each event in the input event sequence to the entity presentation encode may be associated with a textual description of an item. Thus, each event may include a representation of the item generated from the textual description. FIG. 4 illustrates one example way of generating the item representation.

As shown, the process depicted may be used to generate a representation of the item 450 from an item description 410. The item description may include a sequence of words 412a-e. For example, as shown, in some embodiments, a representation of a product may be derived from a short description of the product, for example its title or a summary. However, item representations may be generated from many different types of textual data. In some embodiments, a representation may be generated from a user's text message. In some embodiments, a representation may be generated from a user's search string. In some embodiments, a representation may be generated from a user's voice command.

As shown, in some embodiments, the words in the description 410 may be provided as input to a word model 420. In some embodiments, the word model 420 may map each word $w_i$ in the description to a corresponding encoding for that word $V(w_i)$. In some embodiments, the encoding or representation $V(w_i)$ may be a fixed-size vector. In some embodiments, the $V(w_i)$ representation may be generated via a Skip-gram model, which is trained to reflect the surrounding context of the word in a corpus of training data. For example, the word representation may be generated so that it is useful in predicting other nearby words based on the training data.

As shown, in some embodiments, each word $w_i$ in the description may also be used to determine an inverse document frequency (IDF) value for that word. The IDF value $IDF(w_i)$ for the word may be determined based on the frequency of the word in the corpus of training data. Thus, the more frequently a word appears in the corpus, the lower its IDF value.

As shown, in some embodiments, the encoding of the word $V(w_i)$ and its IDF value $IDF(w_i)$ may be provided to an item representation generator 440, which may implementation a computation to determine the final item representation. In some embodiments, as shown, the encoding $V(w_i)$ of each word in the description 410 may be multiplied by its IDF value $IDF(w_i)$, and the resulting value may be summed across all words in the description 410. As may be appreciated, the combination associates common words such as "of" and "the" with less weight than rarer words in the corpus. In some embodiments, the sum may then be normalized by the total IDF values of all the words in the title. In some embodiments, the process produces a fixed-size representation 450 of the item. As discussed, these item representations 450 may then be included in input events to the entity encoder, which uses the events to generate entity representations.

Figure 5B:
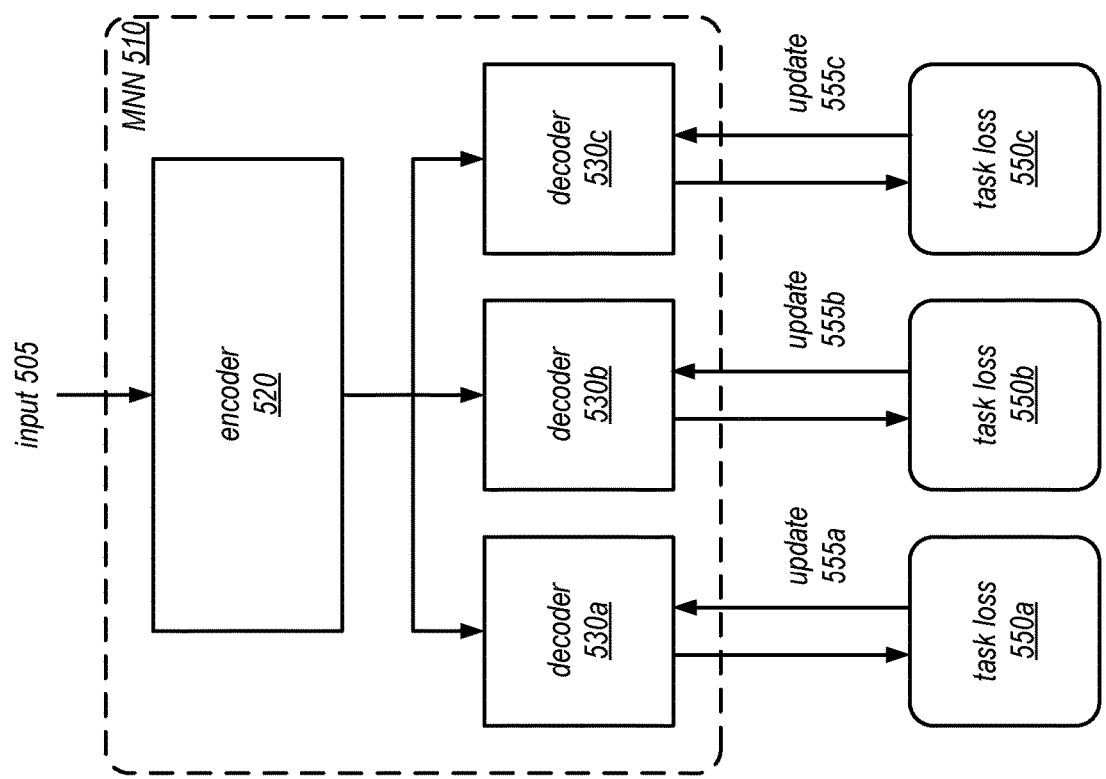
FIGS. 5A and 5B illustrate two different example training approaches to train an entity representation generator to generate dense entity representations that contain attribute signals, according to some embodiments.
Figure 5A:
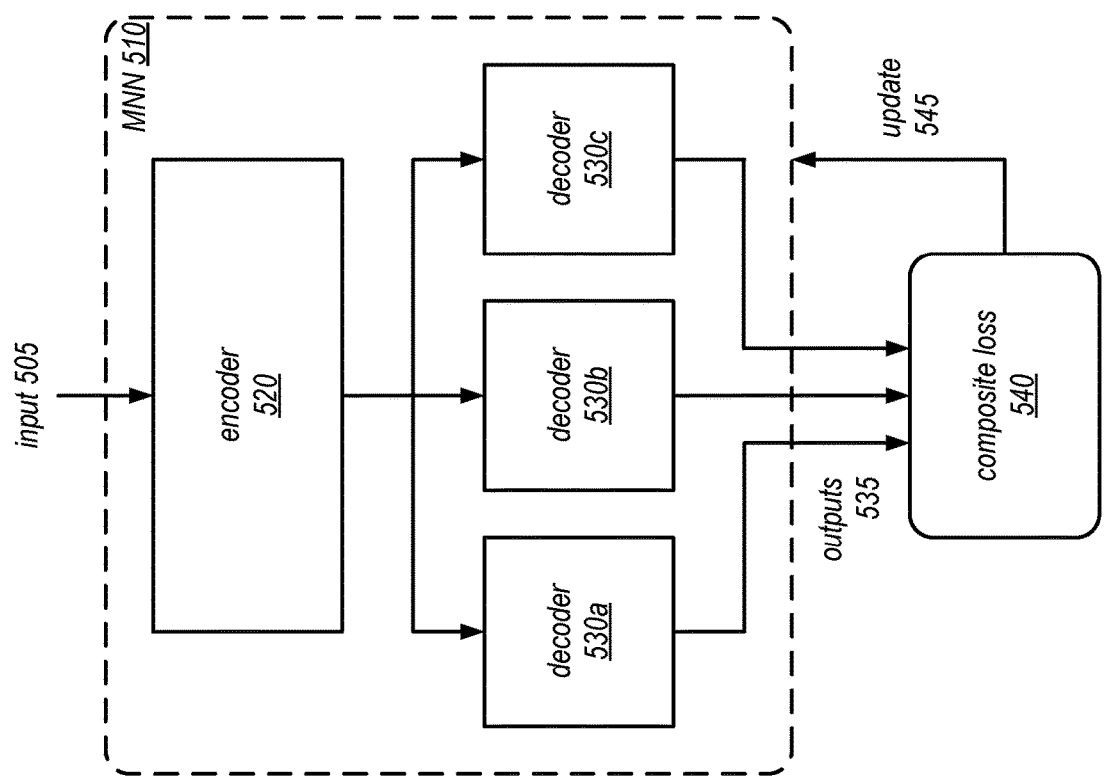

FIGS. 5A and 5B illustrate two different example training approaches to train an entity representation generator to generate dense entity representations that contain attribute signals, according to some embodiments. As discussed, the training may be performed either jointly on all of the decoders (FIG. 5A), or individually (FIG. 5B) for example in an alternating fashion. Thus, in some embodiments, the cost function may be optimized in two different ways, as shown.

As shown in FIG. 5A, in a joint optimization approach, at each iteration of training, all weights of the MNN 510 (including the encoder layer 520) are updated 540 using gradients computed with respect to a composite loss 540. Thus, all prediction errors for the individual decoders 530a-c are taken into account in a single loss value. In some embodiments, the loss values of different decoders 530 may be weighed differently, so emphasize the importance of some decoders over others. In some embodiments, the training system may allow the composite loss function to be configured, so that the training focus can be adjusted over time.

As shown in FIG. 5B, in an individual optimization approach, at each iteration of training, one (or some subset) of the decoders 530 (and an associated task) is chosen. In some embodiments, the decoders that are used for each iteration is chosen in a pseudorandom fashion. In some embodiments, the decoders for each iteration is chosen based on the available truth labels for the training data for that iteration. In some embodiments, the training system may select a decoder from among the decoders 530a-c for each iteration in an alternating fashion, by for example, sampling from different sets of training data over successive training iterations. In some embodiments, at each training iteration, the MNN 510 (including the encoder layer 520) is trained with respect to the loss 550a-c corresponding to the chosen decoder or task. In this case, the weights which correspond to that particular task and the weights of task-invariant layers (e.g., the encoder layer 520) are updated 555a-c individually based on their respective loss values 550a-c. However, the task-specific weights of other tasks are not updated in that particular iteration. In some embodiments, this style of training is preferable when not all task labels for all tasks are available. However, in some cases, the training might be biased towards a specific task if the number of training examples corresponding to that task is significantly higher than other tasks. Thus, in some embodiments, the training may sample training data batches for each task in a uniform manner to avoid biasing towards any specific task. In addition, in some embodiments, the MNN 510 may be implemented as a flexible framework that allows modelers to add or remove training decoders 530 to train the encoder 520, so that the framework can be used to train entity representation encoders in a variety of different decoder groups.

Figure 6:
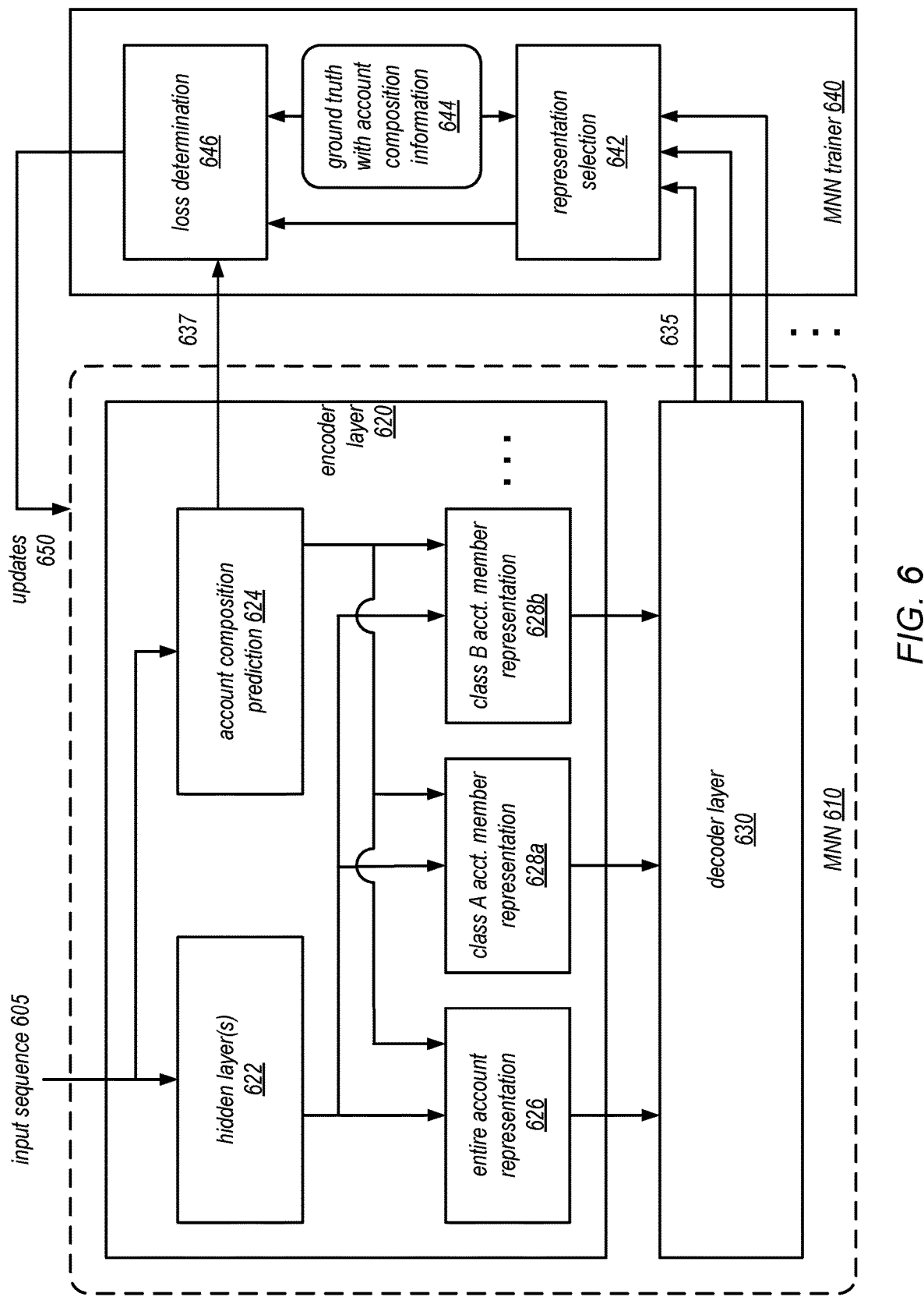
FIG. 6 illustrates an example training system that trains an entity representation generator to generate dense entity representations for different members in a multi-member account, according to some embodiments.

FIG. 6 illustrates an example training system that trains an entity representation generator to generate dense entity representations for different members in a multi-member account, according to some embodiments.

In some embodiments, as shown, an input sequence 605 for the MNN 610 may comprise a sequence of events for a multiuser account, which may include one or more users.

For example, an account may be shared by members of a household, and all events in the input sequence 605 may relate to the account, as opposed to the individual members. Thus, in some embodiments such as the embodiment shown in the figure, the training system may be configured to learn the representations of each account member and as well as the overall account representation. This training system requires ground truth data corresponding the composition of accounts to exist in the training data (e.g. training data 644).

In some embodiments of this training system, a classification of the members within the account are made. The classification may be made based on, for example, the age and/or gender of the members. For example, in some embodiments, six different age bands (e.g., 0-5, 5-10, 10-18, 18-30 and so on) and two genders may be used to define the classes, so that there are twelve different classes. In some embodiments, some of the classes may overlap. In some embodiments, one superclass may be defined to cover all of the classes. The MNN 610 will then be configured so that it will be trained to learn different class-specific representations for each class. For example, as shown, members of class A in the account will be represented in a representation layer 628a in the MNN 610, and members of class B in the account will be represented in a representation layer 628b in the MNN 610. In some embodiments, as shown, a global representation for the entire account 626 may also be learned from the input sequence 605.

In some embodiments, as events from the sequence 605 are consumed by the encoder layer 620, the encoder layer 620 makes ongoing predictions of the likely distribution of the member classes in the account. As shown, these predictions may be performed via an account composition prediction portion 624 of the encoder layer. In some embodiments, the account composition prediction portion 624 may be a portion of an RNN that is repeatedly updated with each successive event in the input sequence 605. In some embodiments, the output of the account composition prediction 624 may comprise a bit vector having one bit for each class, indicating whether each particular class is predicted to be present in the account. In some embodiments, the output may comprise a probability value for each class, indicating the probability of the presence of each class in the account. In some embodiments, it may be assumed that there is only one person in each account for each particular class. In some embodiments, the account composition prediction portion 624 may be architected so that it can account for multiple members of the same class.

In some embodiments, as shown, the final representations of the different classes (e.g., classes 626, 628a, 628b, etc.) are determined based on the results of the account composition prediction 624, as well as other hidden layers 622 of the encoder layer. Thus, in some embodiments, the account composition prediction 624 may serve a gating function, allowing certain class representations to be influenced more by the training based on the predicted account composition. For example, in an event sequence 605 that is determined to not include a child, the class representation for that type of member may not be heavily trained by that sequence. In some embodiments, the representations of the different classes may be conditioned on the learned probability distribution during training and testing. For example, in some embodiments, if the account composition prediction indicates that a particular member class does not exist in the account, the representation associated with that class may not be generated as an output at all from the encoder layer.

As shown, after the class representations are generated from the encoder layer, they are then fed into the decoder layer 630 to performed the various ML tasks implemented by the decoders. In some embodiments, the decoding may be performed jointly for each class representation, so that the decoders will generate different prediction outputs for each representation. In some embodiments, the decoders may generate outputs for each class representation in succession.

As shown, in some embodiments, the output of the MNN 610 are then provided 635 to a MNN trainer 640, which may be implemented as part of the training system. In some embodiments, the MNN trainer 640 may iteratively receive the prediction outputs of the MNN 610, compare them to the ground truth labels in the training data 644 to generate a loss value, and then use the loss value to update 650 the MNN 610.

As shown, in some embodiments, the MNN trainer 640 may implement a representation selector 642. In some embodiments, the representation selector 642 may select which class representations are used to compute the loss value for each training iteration. In some embodiments, the selection may be based on the ground truth information for actual account compositions in the account in the training data for that iteration. Thus, for example, if a family account has a male of age 35, female of age 32, and a kid of age 7, then only the outputs associated with those class representations are used to generate the loss. In this manner, the MNN trainer 640 may be configured to focus the training on the correct set of member class representations during each training iteration. For example, in a family that has no kids, the MNN training 640 will not determine a loss with respect to the class representation associated with kids and update the MNN using that loss.

As shown, in some embodiments, the output from the selected class representations are then provided to a loss determination module 646 in the MNN trainer 640, which determines a loss value for the training iteration. As shown, in some embodiments, the output of the account composition predictor 624 in the encoder layer may also be provided 637 to the loss determination module 646, so that the computed loss may be generated based on the prediction error of the predictor 624. That is, in some embodiments, the account composition prediction is treated as another output of the MNN 610 which is used to train the MNN 610. In some embodiments, the account composition predictor 624 may be trained in conjunction with the other decoder tasks. In some embodiments, the account composition predictor may be trained before the other decoder tasks, in a first stage. Then, in a second stage, the decoder tasks may be trained without updating the account composition predictor.

In some embodiments, a single composite loss value may be generated for all relevant class representations in a training iteration. In some embodiments, loss values may be generated for each individual class representation impacted by that iteration. As discussed earlier, the same is true for the different decoder tasks. That is, depending on the embodiment, a single loss value may be generated for all decoder tasks, or individual loss values may be generated for each individual decoder task. In some embodiments, the update 650 may occur in a single pass based on one or more of the loss values. In some embodiments, the update 650 may include multiple update passes, so that each generate loss value may correspond to a separate backpropagation pass, for example. In some embodiments, the updates 650 may be configured to only update certain portions of the encoder layer 620. For example, in some embodiments where each different class representation is associated with representation-specific hidden layers or units, the updating process may be implemented so that only the hidden layers or units for the relevant representations are updated.

Figure 7B:
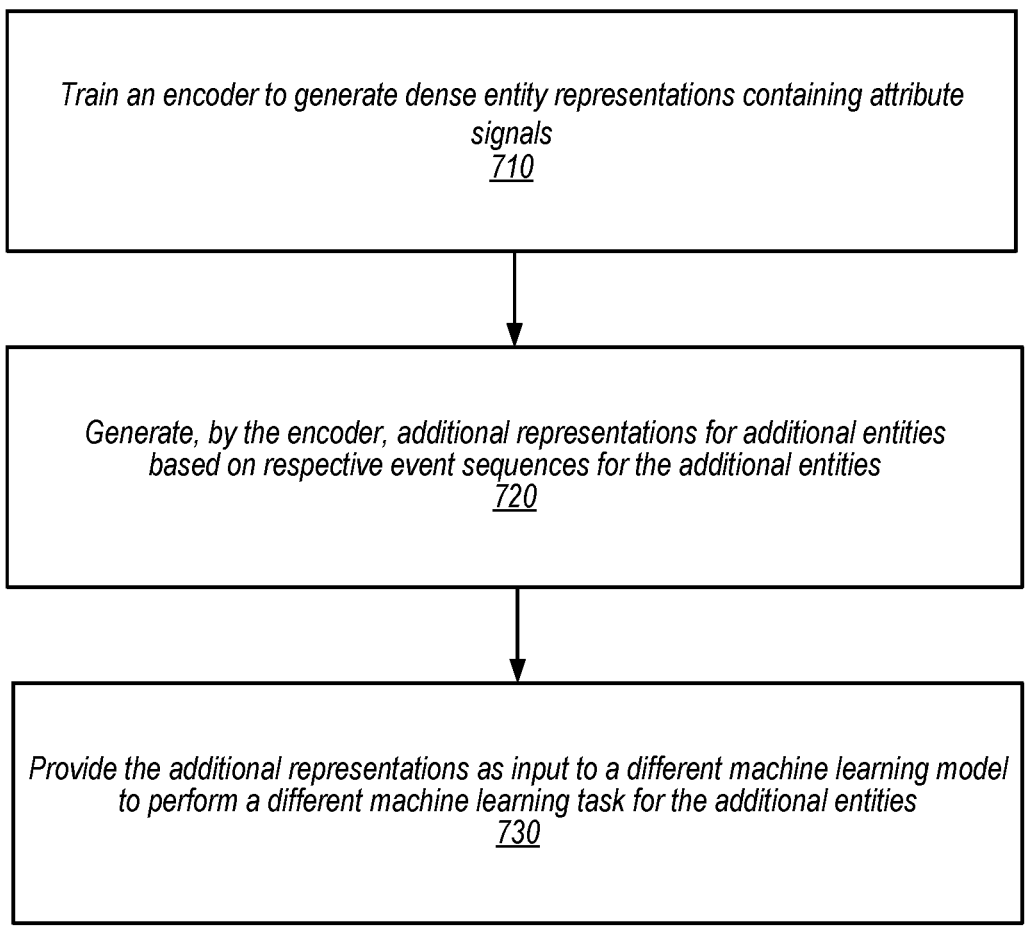

FIGS. 7A and 7B are flowcharts illustrating processes of training and using an entity representation generator to generate dense entity representations that contain attribute signals, according to some embodiments.

FIG. 7A depicts a training process 710 to train an encoder to generate dense entity representations containing attribute signals. The training process may be performed by a training system comprising one or more computers with hardware processors and associated memory. In some embodiments, the training may be performed using a multitask neural network, such as the MNN 100 as discussed in connection with FIG. 1A.

At operation 712, a time-ordered sequence of events associated with an entity is received as input to the MNN. The event sequence may include, for example, a sequence of interactions of a person with different items. In some embodiments, the event sequence may include actions of a person, measured data associated with an entity, successive states of an entity, etc. In some embodiments, the MNN may include an encoder layer and a group of decoders in a decoder layer. The encoder layer may be for example encoder layer 120, as discussed in connection with FIG. 1A, and the decoder layer may be for example the decoder layer 130, as discussed in connection with FIG. 1A. The training system may train the MNN so that the encoder layer is also trained to generate dense entity representations that contain attribute signals for the entities, so that the entity representations may be used as input to other machine learning systems. In some embodiments, the entity representation may be a fixed-size vector.

At operation 714, the encoder layer generates a representation of an entity based on the sequence of events. In some embodiments, the encoder layer may employ a RNN that generates successive hidden states corresponding to successive events in the sequence. In some embodiments, the hidden states may be generated in one or more hidden layers of the MNN based on the events. In some embodiments, the hidden layer may include one or more memory units that store an entity representation generated by the encoder layer. The entity representation, which may be the entity representation 126 as discussed in connection with FIG. 1A, may contain one or more attribute signals that are relevant to the machine learning tasks of the decoders.

At operation 716, the decoders perform respective machine learning tasks to predict different attributes of the individual entities based on the individual entity representations. Thus, the entity representation, for example entity representation 126, is used by the decoders to extract a selected set of attributes of the entity. In some embodiments, the decoders may be selected to extract a set of generic attributes from the input, so that the entity representation or the encoder will be useful for a wide variety of later ML systems that use either the representation or the encoder. For example, in some embodiments, decoders may be selected to predict the gender, age, income level, height, or weight of a person, which are personal attributes that may be useful for other ML systems.

At operation 718, the encoding layer is updated as a result of the MNN training to generate new dense entity representations for new entities for input to one or more other machine learning models, where the new entity representations contain attribute signals indicating the different attributes. In some embodiments, the encoder layer may be trained in conjunction with the MNN and the decoders via a machine learning technique, such as a stochastic gradient descent technique. In some embodiments, at each iteration of training, the encoder layer is updated according to a combined loss determined for all decoders. In some embodiments, at each training iteration, only one or a subset of the decoders are trained, and the encoder layer is updated based on the loss of only those decoders. As the decoders are trained to perform the different machine learning tasks, the encoder layer is simultaneously trained to extract attribute signals from the events that are useful to the different machine training tasks. As discussed, these entity representations are denser and smaller in size than for example TD-IDF bag-of-words representations, where most of the bits in the vectors are zeros. In addition, the entity representations generated in this manner contain rich semantic meaning for downstream ML models. Accordingly, these entity representations and the resulting encoder are much more useful for building downstream ML systems. Moreover, because the entity representations do not readily reveal event sequence from which it is built, in some embodiments, the representations themselves may be published to third parties, even though the event sequences themselves are private or confidential.

FIG. 7B depicts a use case for a trained encoder, as trained for example in the manner described in FIG. 7A. For example, operation 710 may be performed in similar fashion as discussed in connection with FIG. 7A.

At operation 720, the encoder may be used to generate additional entity representations for additional entities based on their respective event sequences. Thus, in some embodiments, the trained encoder layer of the MNN may be used as a standalone machine learning model or system that takes as input additional event sequences and generates as output entity representations or embeddings that may be used as input into other machine learning models or systems. In some embodiments, the trained encoder may be used to generate a library of entity representations or embeddings to be used for other machine learning systems. For example, in one embodiment, a social network having many users may be used to generate a library of representations of the users, based on their postings in the social network. Different trained encoders may be used to generate entity representations or embeddings for different types of attributes, different categories of entities, or different types of event sequences. For example, in one embodiments, the same set of user comments in a general discussion board may be used to generate a first user representation for future product purchases, and a second user representation for potential professional contacts.

At operation 730, the additional entity representations are provided as input to a different machine learning model to perform a different machine learning task on the additional entities. As discussed, in some embodiments, the encoder may be a standalone model or system. In other embodiments, the encoder may be used as an encoder layer that is incorporated into a larger machine learning system, and be configured to directly feed input event sequences into later portions of the larger machine learning system. The additional entity representations may be used to make different predictions implemented by the different machine learning systems. In some embodiments, the encoder may be used to train new machine learning systems. In such trainings, the encoder may be used to generate input to the machine learning model under training, but the encoder itself may not change during the course of the training.

Figure 8:
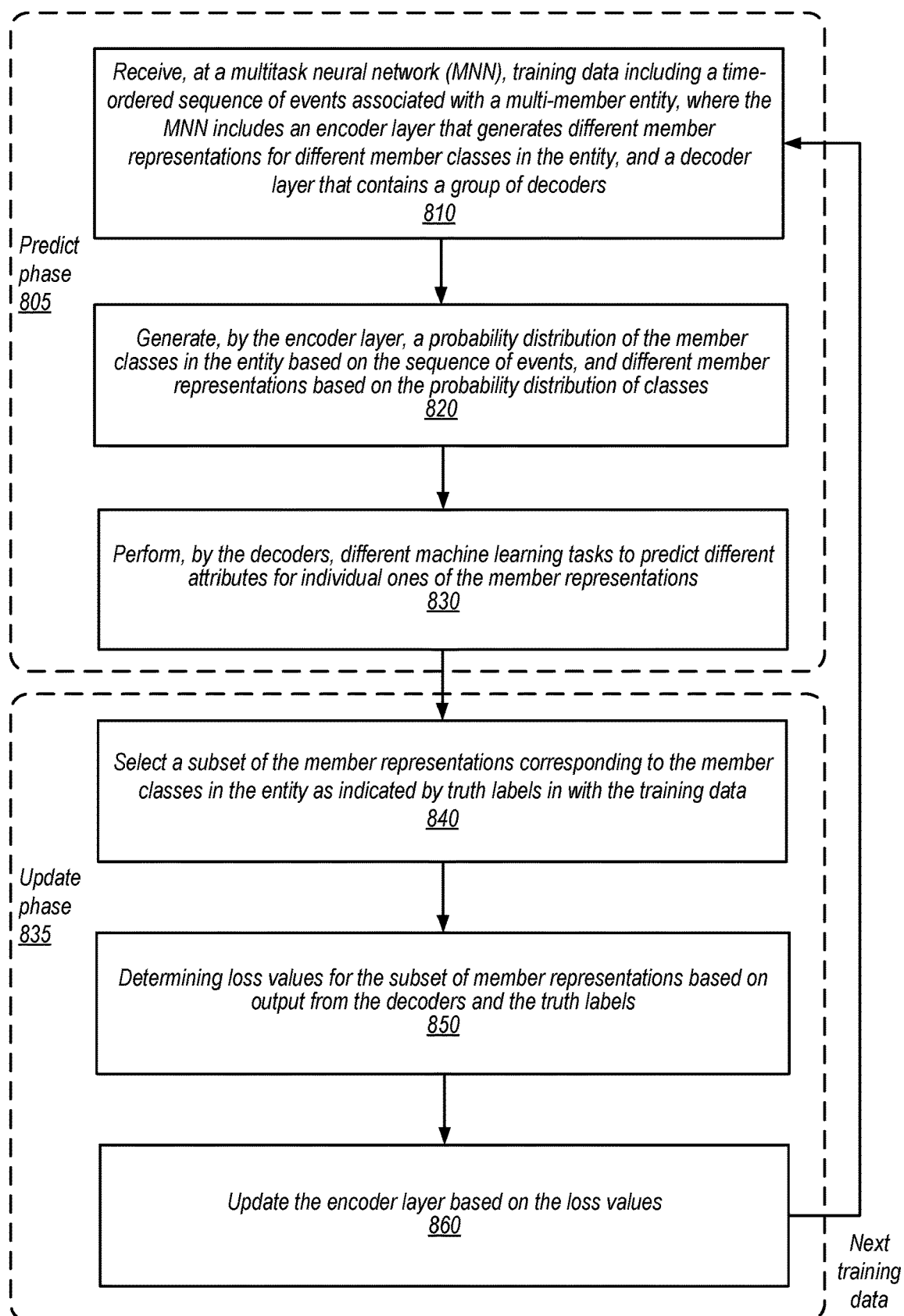
FIG. 8 is a flowchart illustrating processes of training an entity representation generator to generate dense entity representations for members in a multi-member account, according to some embodiments.

FIG. 8 is a flowchart illustrating processes of training an entity representation generator to generate dense entity representations for members in a multi-member account, according to some embodiments. As shown, the training process may be separated into a predict phase 805 and a update phase 835, where during each training iteration, an individual training data record is passed through the ML model under training and the generated output is used to update the ML model. The process may then be repeated between the two phases for successive training iterations for different training data records. In some embodiments, the predict phase 805 may be performed by for example MNN 610, as discussed in connection with FIG. 6, and the update phase 835 may be performed by for example the MNN trainer 640, as discussed in connection with FIG. 6.

At operation 810, training data including a time-ordered sequence of events is received by a MNN, which may be MNN 610 of FIG. 6. The sequence of events may be associated with a multi-member entity, such as for example a family account or a sports team, etc. In some embodiments, the MNN may include an encoder layer and a group of decoders in a decoder layer, such that as the decoders are trained to perform their respective ML tasks, the encoder layer is trained to generate entity representations to include attribute signals that are useful for the ML tasks. In some embodiments, the encoder layer is configured to generate different member representations for different classes of members in the entity. For example, in some embodiments, a family account having multiple family members may be modeled with different member classes based on the members' gender and/or age bracket.

At operation 820, the encoder layer generates a probability distribution of the member classes in the entity from the sequence of events. In addition, the encoder layer generates the different member representations based on the probability distribution of classes. For example, in some embodiments, the encoder layer may make a prediction of the member composition of a family based on the account's purchases. In some embodiments, this prediction may be made using a RNN, which generates successive hidden states based on each successive event in the input event sequence. In some embodiments, the probability distribution may simply indicate whether a member classes exists or not within the entity. In some embodiments, the probability distribution may indicate a numerical value reflecting a probability or likelihood that a given member class is in the entity. In some embodiments, the generation of the member representations may depend on the predicted composition probability distribution. In some embodiments, the member representations may be conditioned on the composition probability distribution. For example, if the composition probability distribution indicates that a particular member class is not likely to exist in the entity, the encoder layer may refrain from generating a member representation for that class.

At operation 830, the decoders perform different machine learning tasks to predict different attributes of the individual member representations. Thus, the decoders may treat each member representation, such as member representations 628a and 628b in FIG. 6, as individual representations to be used to perform the decoding tasks. In some embodiments, the decoding tasks may be performed on the different member representations jointly. In some embodiments, the decoding tasks may be performed on the different member representations separately, possibly over multiple passes over the decoder layer portion of the MNN. As discussed, the decoders may be selected to extract a set of generic attributes for each member representation, so that the entity representations or the encoder will be useful for a wide variety of later ML systems that use either the representation or the encoder. In some embodiments, different member representations may be used for different sets of decoder tasks.

At operation 840, a subset of the member representations corresponding to member classes as indicated by truth labels in the training data. As discussed, operations 840, 850, and 860 may be performed by a MNN trainer to update the MNN, after the MNN has generated its output. In some embodiments, the training data may include truth labels that indicate the actual composition of an entity or account with respect to its constituent members. Thus, using this ground truth data, the MNN trainer may select only output from member representations that are actually in the entity. In this manner, any loss values that are computed to update the MNN are generated for actual members in the entity. In some embodiments, this operation may be optional, because in some embodiments, the MNN may only generate member representations that are likely to be in the entity based on the probability distribution of member classes determined by the encoder. In some embodiments, the MNN may only generate output for those member representations that are predicted to be members of the entity.

At operation 850, one or more loss values are determined for the subset of member representations based on output from the decoders and the ground truth data. Thus, the loss values are only determined for members that are actually in the entity. In some embodiments, different loss values may be generated for separate member representations. In some embodiments, the output for all member representations in the subset are used to generate a combined loss value. In some embodiments, separate loss values may be generated for each decoder task. In some embodiments, a composite loss value may be generated for all decoder tasks.

At operation 860, the encoder layer, along with the rest of the MNN, is updated based on the loss values. In this manner, the entire MNN, including the encoder layer, is trained to extract useful attributes from the input data. In some embodiments, the updates may be performed in a single pass of the MNN. In some embodiments, each different loss value (e.g., each loss value associated with a member representation or decoder task) results in a separate update of the MNN. In some embodiments, an update corresponding to an individual member representation may update only a portion of the encoder layer that is used to generate that member representation. After the updating of the MNN is finished, the process then process repeats for the next record in the training data, and so on, gradually updating the MNN to achieve better performance on the decoder tasks.

Figure 9:
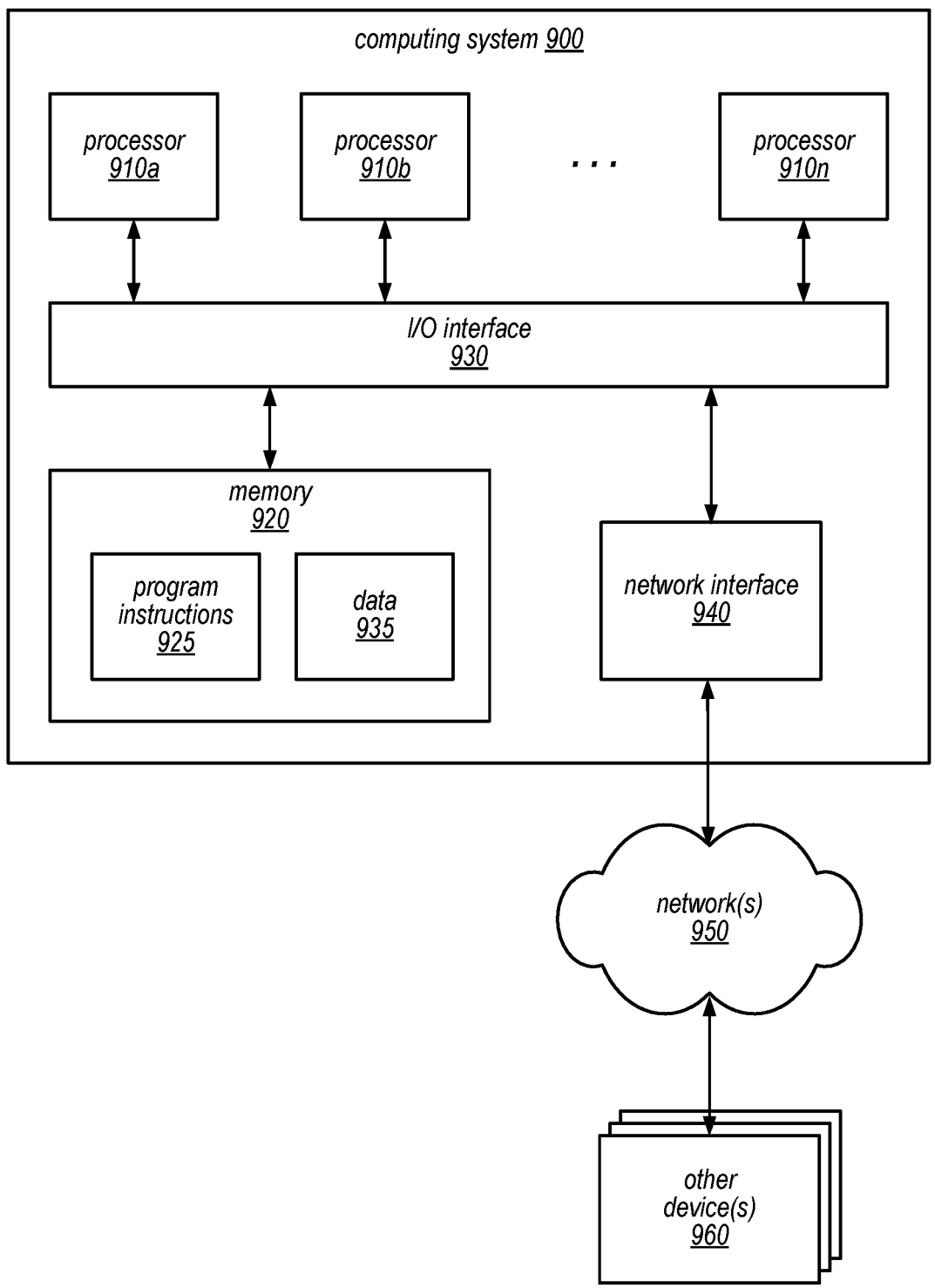
FIG. 9 is a block diagram illustrating an example computer system that can be used to implement one or more portions of an entity representation generator to generate dense entity representations that contain attribute signals, according to some embodiments.

FIG. 9 is a block diagram illustrating an example computer system that can be used to implement one or more portions of an entity representation generator to generate dense entity representations that contain attribute signals, according to some embodiments. Computer system 900 may include or be configured to access one or more nonvolatile computer-accessible media. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 935.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices, such as routers and other computing devices, as illustrated in FIGS. 1 through 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 8 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:
1. A system, comprising:
 a training system implemented by one or more hardware processors with associated memory, wherein the memory stores program instructions that when executed on the one or more hardware processors cause the training system to:
  train a multitask neural network (MNN) to perform a plurality of machine learning tasks to predict a plurality of attributes of entities, wherein the plurality of machine learning tasks is selected for performing a downstream machine learning task, and wherein the MNN comprises:
   an encoder layer configured to:
    receive a time-ordered sequence of events associated with an entity, wherein the entity includes multiple members associated with a user account;
    generate, based at least in part on the time-ordered sequence of events, a member composition of the user account that indicates classes of the multiple members in the user account; and generate a fixed-size representation of the entity based at least in part on the time-ordered sequence and the member composition of the user account; and a decoder layer including a plurality of decoders configured to:

receive the fixed-size representation of the entity; and perform the machine learning tasks based at least in part on the fixed-size representation of the entity to output the plurality of attributes of the entity;

wherein the training trains the encoder layer to encode signals of the plurality of attributes in fixed-size representations of entities for use by the downstream machine learning task;

after the MNN is trained, store the trained encoder as part of an entity representation generator; and train a second machine learning model to perform the downstream machine learning task, wherein second machine learning model is trained using entity representations generated by the entity representation generator that includes the signals of the plurality of attributes associated with the plurality of machine learning tasks.

2. The system of claim 1, wherein the entity includes a person, and one or more of the plurality of decoders are configured to perform classifications of the person including one or more of an age classification, gender classification, or income classification.

3. The system of claim 1, wherein the entity includes a person, individual events in the time-ordered sequence of events indicate interactions of the person with items, and one or more of the plurality of decoders are configured to predict attributes of one or more future interactions of the person with items.

4. The system of claim 1, wherein the training system causes the plurality of decoders to be trained in an alternating fashion in a plurality of training iterations, and the encoder layer to be updated, in individual ones of the training iterations, based at least in part on a loss function for a particular decoder selected for the individual training iteration.

5. The system of claim 1, wherein the encoder layer comprises a recurrent neural network (RNN) that generates respective hidden states for individual events in the time-ordered sequence of events and stores the respective hidden states in one or more long short-term memory (LSTM) units.

6. A method, comprising:

selecting a plurality of machine learning tasks to predict a plurality of attributes of entities to train an entity representation generator for performing a downstream machine task;

training a multitask neural network (MNN) to perform the plurality of machine learning tasks, wherein the MNN comprises an encoder layer and a decoder layer including a plurality of decoders corresponding to the attributes, and the training comprises:

receiving, via the encoder layer, a time-ordered sequence of events associated with an entity, wherein the entity includes multiple members associated with a user account;

generating, via the encoder layer, a member composition of the user account that indicates classes of the multiple members based at least in part on the time-ordered sequence of events;

generating, via the encoder layer, a fixed-size representation of the entity based at least in part on the time-ordered sequence of events and the member composition of the user account; and performing, via the decoders, the machine learning tasks based at least in part on the fixed-size representation of the entity to output the attributes of the entity;

wherein the training trains the encoder layer to encode signals of the plurality of attributes in fixed-size representations of entities; and after the MNN is trained, storing the trained encoder layer as part of the entity representation generator; and train a second machine learning model to perform the downstream machine learning task, wherein second machine learning model is trained using entity representations generated by the entity representation generator that includes the signals of the plurality of attributes associated with the plurality of machine learning tasks selected for the downstream machine learning task.

7. The method of claim 6, wherein the entity is a person, and performing the respective machine learning tasks comprises performing one or more classifications of the person including one or more of an age classification, gender classification, or income classification.

8. The method of claim 6, wherein the entity includes a person, individual events in the time-ordered sequence of events indicate the person's interactions with items, and performing the respective machine learning tasks comprises predicting an attribute of one or more future interactions of the person with items.

9. The method of claim 8, wherein the items are different products, one of the person's interactions with a product of the different products includes one or more of searching for the product, viewing the product, purchasing the product, returning the product, or providing feedback on the product, and the respective machine learning tasks comprises predicting one or more attributes of a future product purchase including one or more of a product category of the future product purchase, a time range of the future product purchase, or a price range of the future product purchase.

10. The method of claim 8, wherein the items are different products, and further comprising:

generating product representations for individual products via a recurrent neural network based at least in part on a textual description of the individual products, wherein the product representations are fixed in size and individual events in the time-ordered sequence of events include the product representations.

11. The method of claim 6, further comprising, subsequent to the training of the MNN:

generating, via the entity representation generator, one or more additional representations based at least in part on respective event sequences associated with one or more additional entities; and storing the additional representations in an entity representation library, wherein the additional representations in the entity representation library are used to train another machine learning model or perform another machine learning task.

12. The method of claim 6, further comprising, subsequent to the training of the MNN:

deploying the entity representation generator to a personal assistant device, wherein the personal assistant device is configured to generate, via the entity representation generator, a representation of one or more person associated with the personal assistant device and upload the representation to a personal assistant service; and deploying the second machine learning model to the personal assistant service, wherein the personal assistant service is configured to personalized output for the one or more persons via the personal assistant device.

13. The method of claim 6, wherein MNN is configured to:

generate, via the encoder layer, a probability distribution of the classes of the members of the user account based at least in part on the time-ordered sequence of events;

generate, via the encoder layer, a plurality of member representations corresponding to different ones of the classes, based at least in part on the time-ordered sequence of events and the probability distribution; and perform, via the decoders, the respective machine learning tasks to predict different attributes for individual ones of the member representations.

14. The method of claim 13, wherein the training of the MNN further comprises:

selecting a subset of the member representations corresponding to one or more classes of members in the user account as indicated by labeled training data;

determining one or more loss values for the subset of member representations based at least in part on output from the decoders and the labeled training data; and updating the encoder layer based at least in part on the one or more loss values.

15. The method of claim 14, wherein the determining of one or more loss values comprises determining a loss value for the probability distribution of classes in the entity generated via the encoder layer.

16. A non-transitory computer-accessible storage medium storing program instructions that when executed on one or more processors of a neural network training system, cause the one or more processors to:

select a plurality of machine learning tasks to predict a plurality of attributes of entities to train an entity representation generator for performing a downstream machine task;

train a multitask neural network (MNN) to perform the plurality of machine learning tasks, wherein the MNN comprises an encoder layer connected to a decoder layer including a plurality of decoders corresponding to the attributes, wherein the training causes the MNN to:

receive, via the encoder layer, a time-ordered sequence of events associated with an entity, wherein the entity includes multiple members associated with a user account;

generate, via the encoder layer, a member composition of the user account that indicates classes of the multiple members based at least in part on the time-ordered sequence of events;

generate, via the encoder layer, a fixed-size representation of the entity based at least in part on a time-ordered sequence of events and the member composition of the user account; and perform, via the decoders, the machine learning tasks based at least in part on the fixed-size representation of the entity to output the different attributes of the entity;

wherein the training trains the encoder layer to encode signals of the plurality of attributes in fixed-size representations of entities;

after the MNN is trained, store the trained encoder as part of an entity representation generator; and train a second machine learning model to perform the downstream machine learning task, wherein second machine learning model is trained using entity representations generated by the entity representation generator that includes the signals of the plurality of attributes associated with the plurality of machine learning tasks selected for the downstream machine learning task.

17. The non-transitory computer-accessible storage medium of claim 16, wherein to train the MNN, the program instructions when executed on the one or more processors cause the one or more processors to train the decoders jointly and update the encoder layer at individual training iterations based at least in part on a composite loss function for all of the decoders.

18. The non-transitory computer-accessible storage medium of claim 16, wherein to train the MNN, the program instructions when executed on the one or more processors cause the one or more processors to train the decoders in an alternating fashion in a plurality of training iterations, and update the encoder layer in individual ones of the training iterations based at least in part on a loss function for a particular decoder selected for the individual training iteration.

19. The non-transitory computer-accessible storage medium of claim 16, wherein to generate the fixed-size representation of the entity, the program instructions when executed on the one or more processors cause the one or more processors to generate respective hidden states in a recurrent neural network (RNN) for individual events in the time-ordered sequence of events; and store the hidden states in one or more one or more long short-term memory (LSTM) units.

20. The non-transitory computer-accessible storage medium of claim 16, wherein the entity includes a person, individual events in the time-ordered sequence of events indicate the person's interactions with different products, and the respective machine learning tasks comprises predicting one or more attributes of a future product interaction by the person.

* * * * *